(12) United States Patent
DeLorean

(10) Patent No.: US 10,592,916 B1
(45) Date of Patent: *Mar. 17, 2020

(54) VEHICLE-MOUNTED, MOTION-CONTROLLED SIGN

(71) Applicant: DeLorean, LLC, Bloomfield, MI (US)

(72) Inventor: Jack Z. DeLorean, Bloomfield, MI (US)

(73) Assignee: DeLorean, LLC, Bloomfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,283

(22) Filed: Apr. 2, 2019

Related U.S. Application Data

(63) Continuation-in-part of application No. 15/950,445, filed on Apr. 11, 2018, which is a continuation of application No. 15/363,540, filed on Nov. 29, 2016, now Pat. No. 9,972,230, which is a continuation-in-part of application No. 14/657,570, filed on Mar. 13, 2015, now Pat. No. 9,607,510, which is a continuation-in-part of application No. 14/022,141, filed on Sep. 9, 2013, now abandoned.

(60) Provisional application No. 61/699,992, filed on Sep. 12, 2012.

(51) Int. Cl.
```
G08G 1/09      (2006.01)
G06Q 30/02     (2012.01)
G08G 1/095     (2006.01)
G08G 1/052     (2006.01)
G08G 1/096     (2006.01)
```
(52) U.S. Cl.
CPC ......... *G06Q 30/0241* (2013.01); *G08G 1/052* (2013.01); *G08G 1/095* (2013.01); *G08G 1/096* (2013.01)

(58) Field of Classification Search
CPC .......... G08G 1/052; G08G 1/095; G08G 1/096
See application file for complete search history.

(56) References Cited

U.S. PATENT DOCUMENTS

| | | | | |
|---|---|---|---|---|
| 3,322,032 A | * | 5/1967 | Leach | G09F 19/18 353/38 |
| 4,663,871 A | | 5/1987 | Young | |
| 5,150,116 A | | 9/1992 | West | |
| 9,607,510 B1 | | 3/2017 | DeLorean | |
| 9,972,230 B1 | | 5/2018 | DeLorean | |
| 2002/0098001 A1 | * | 7/2002 | Dahl | G03B 17/48 396/429 |
| 2006/0143956 A1 | | 7/2006 | Star et al. | |

(Continued)

OTHER PUBLICATIONS

Office action for U.S. Appl. No. 15/363,540, dated Oct. 30, 2017, DeLorean, "Traffic Display With Viewing Distance Control", 13 pages.

(Continued)

*Primary Examiner* — Brent Swarthout
(74) *Attorney, Agent, or Firm* — Lee & Hayes, P.C.

(57) ABSTRACT

A system configured to be mounted to a vehicle, the system including a display viewable over a predetermined range of distances and a motion sensor configured to detect speeds of one or more vehicles within the predetermined range of distances of the display. The system may receive, via the motion sensor, the speeds of the one or more vehicles and based at least in part on the speeds of the one or more vehicles relative to a threshold speed may display first image data or second image data.

15 Claims, 19 Drawing Sheets

(56) References Cited

U.S. PATENT DOCUMENTS

| | | |
|---|---|---|
| 2006/0229939 A1 | 10/2006 | Bhakta et al. |
| 2007/0205963 A1 | 9/2007 | Piccionelli et al. |
| 2010/0002079 A1 | 1/2010 | Krijn et al. |
| 2010/0063885 A1 | 3/2010 | Merkin et al. |
| 2010/0109287 A1* | 5/2010 | MacDougall ............. G09F 7/20 280/491.1 |
| 2010/0207961 A1* | 8/2010 | Zomet ................ G02B 27/2214 345/630 |
| 2011/0018738 A1 | 1/2011 | Feroldi |
| 2011/0106595 A1 | 5/2011 | Vande Velde |

OTHER PUBLICATIONS

Office action for U.S. Appl. No. 15/950,445, dated Nov. 21, 2018, DeLorean, "Traffic Display With Viewing Distance Control", 7 pages.

Office action for U.S. Appl. No. 15/950,445, dated Jul. 17, 2018, DeLorean, "Traffic Display With Viewing Distance Control", 8 pages.

\* cited by examiner

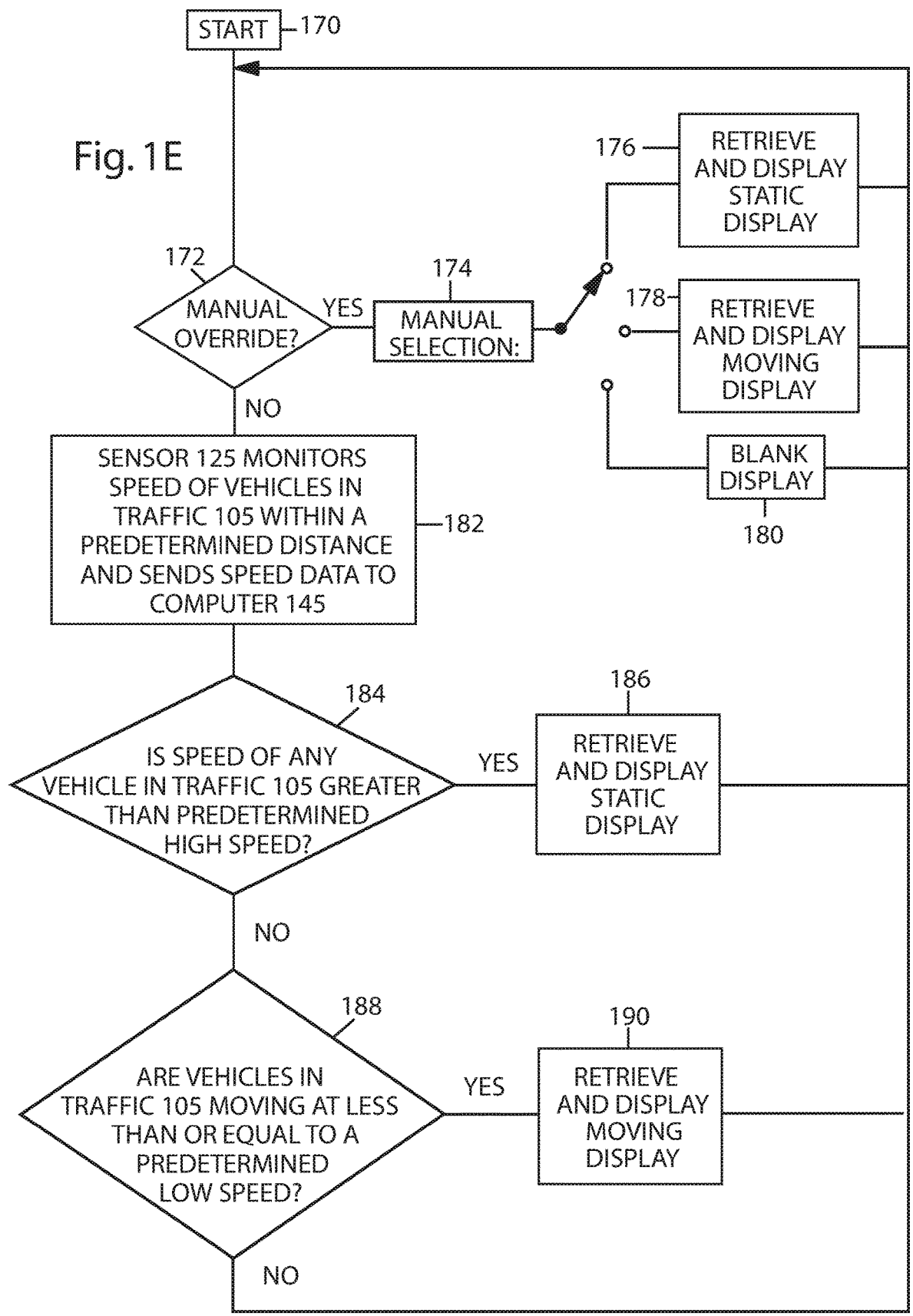

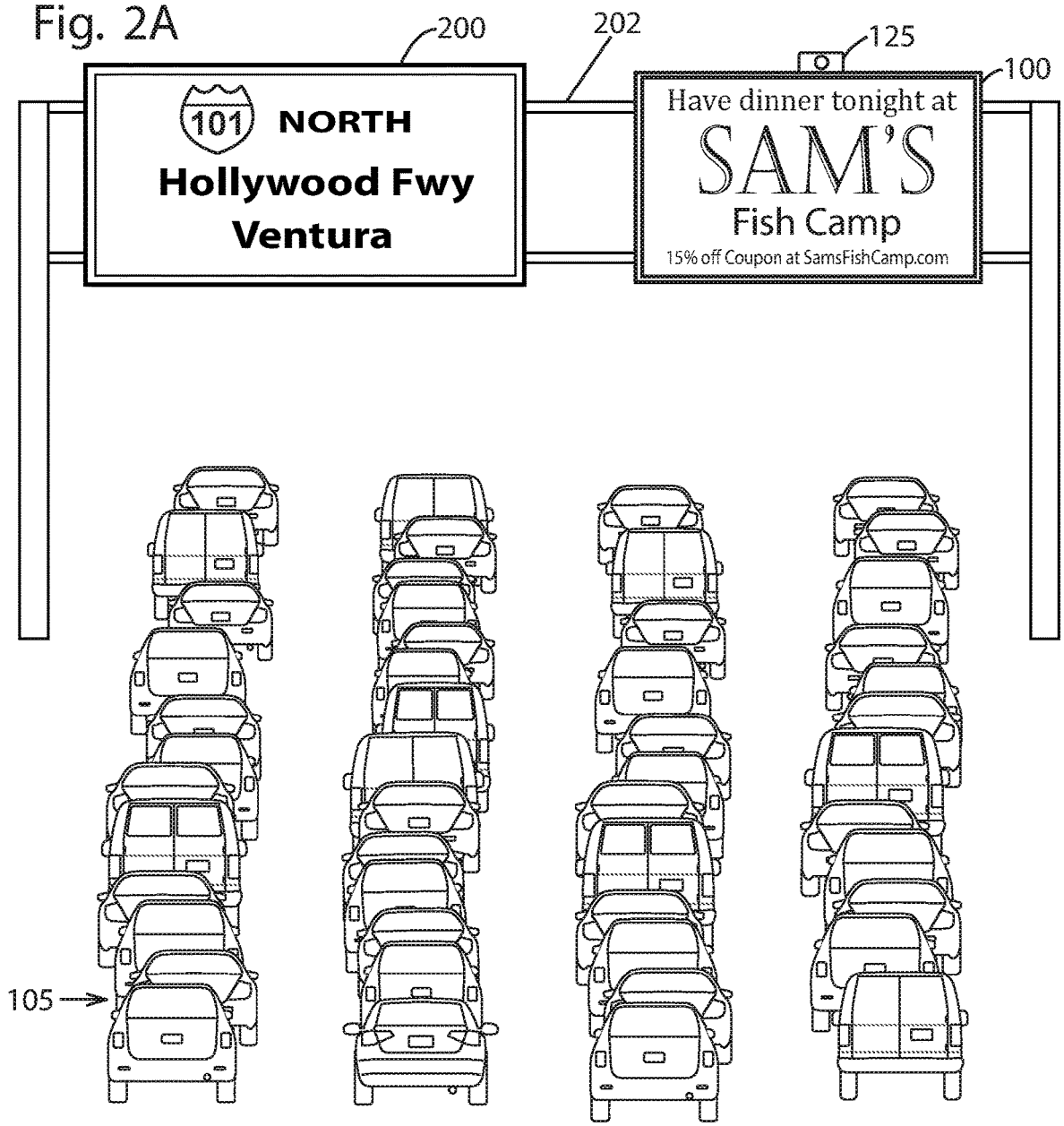

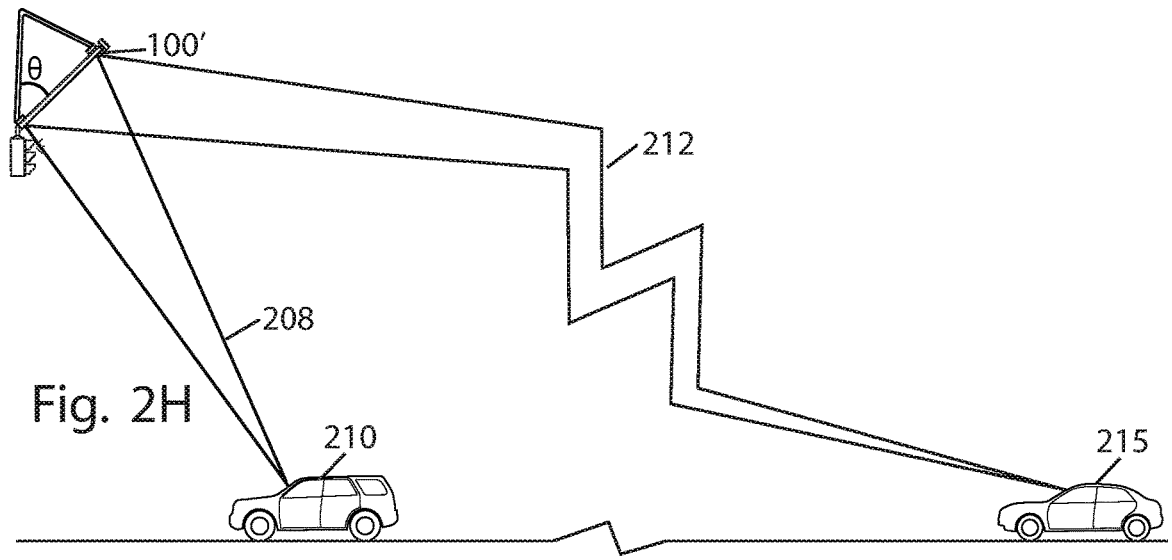
Fig. 2H
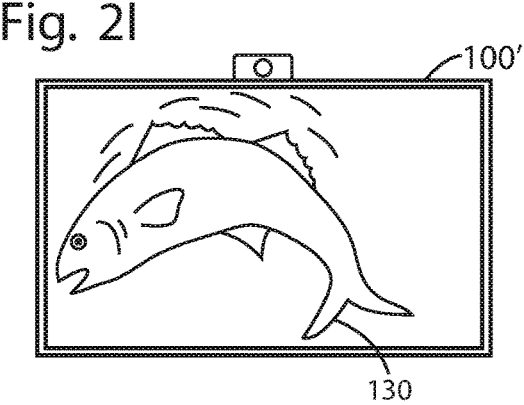
Fig. 2I
Fig. 2J1
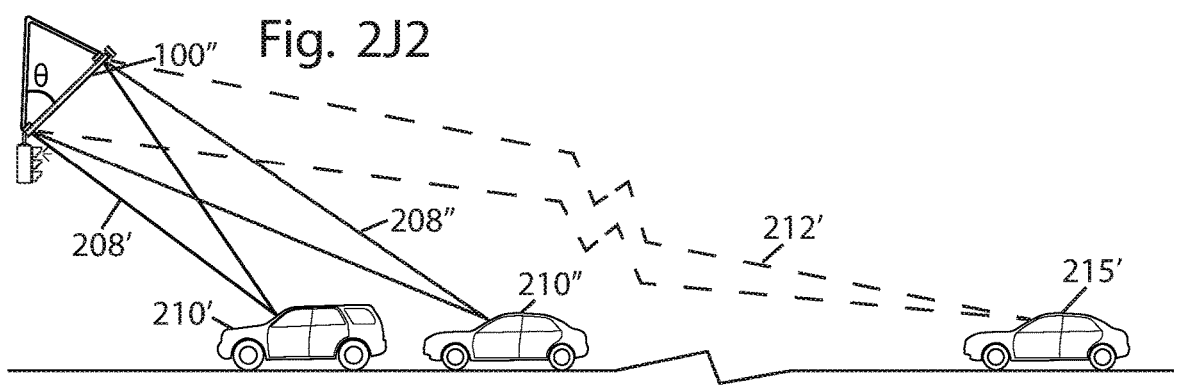
Fig. 2J2

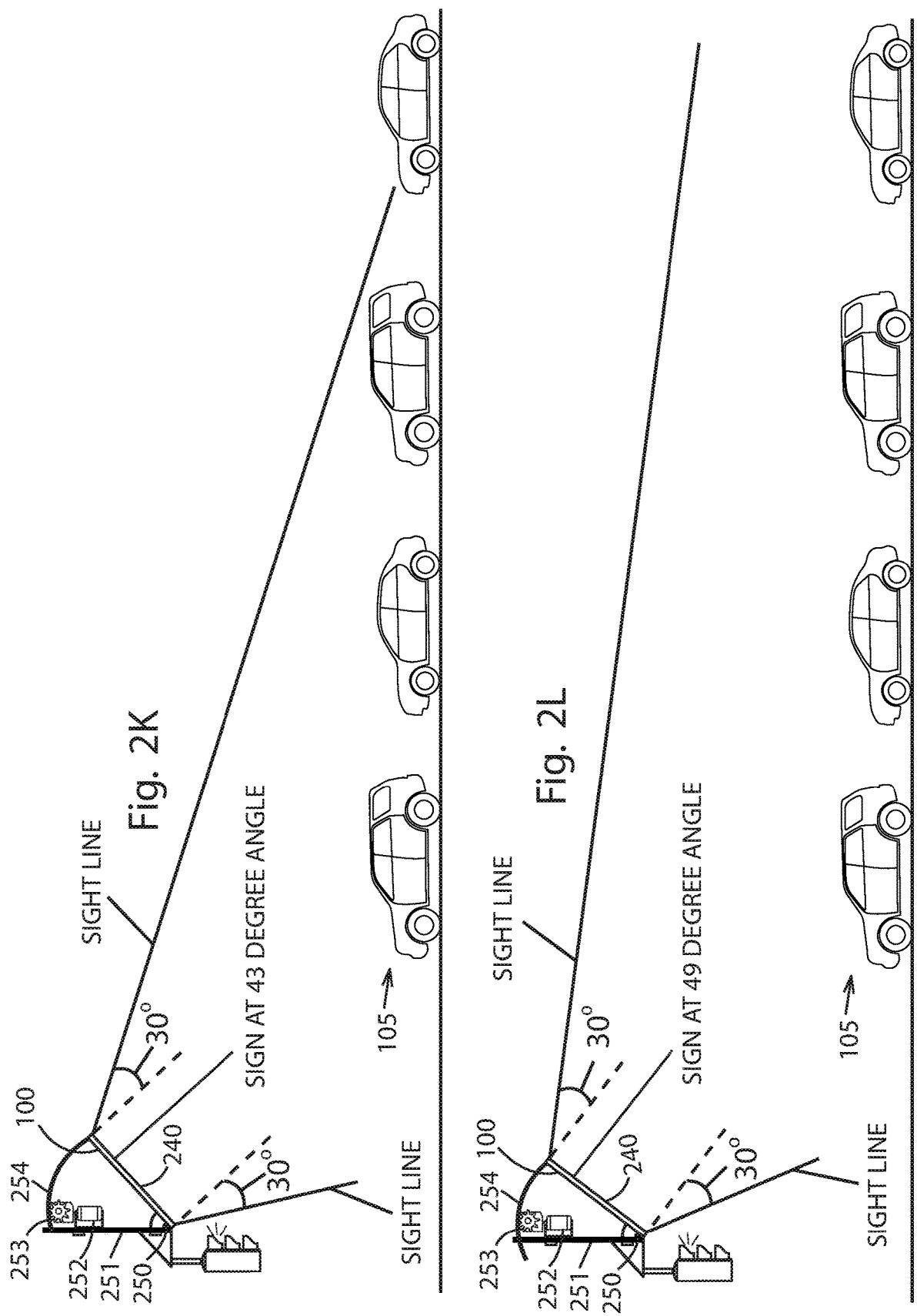

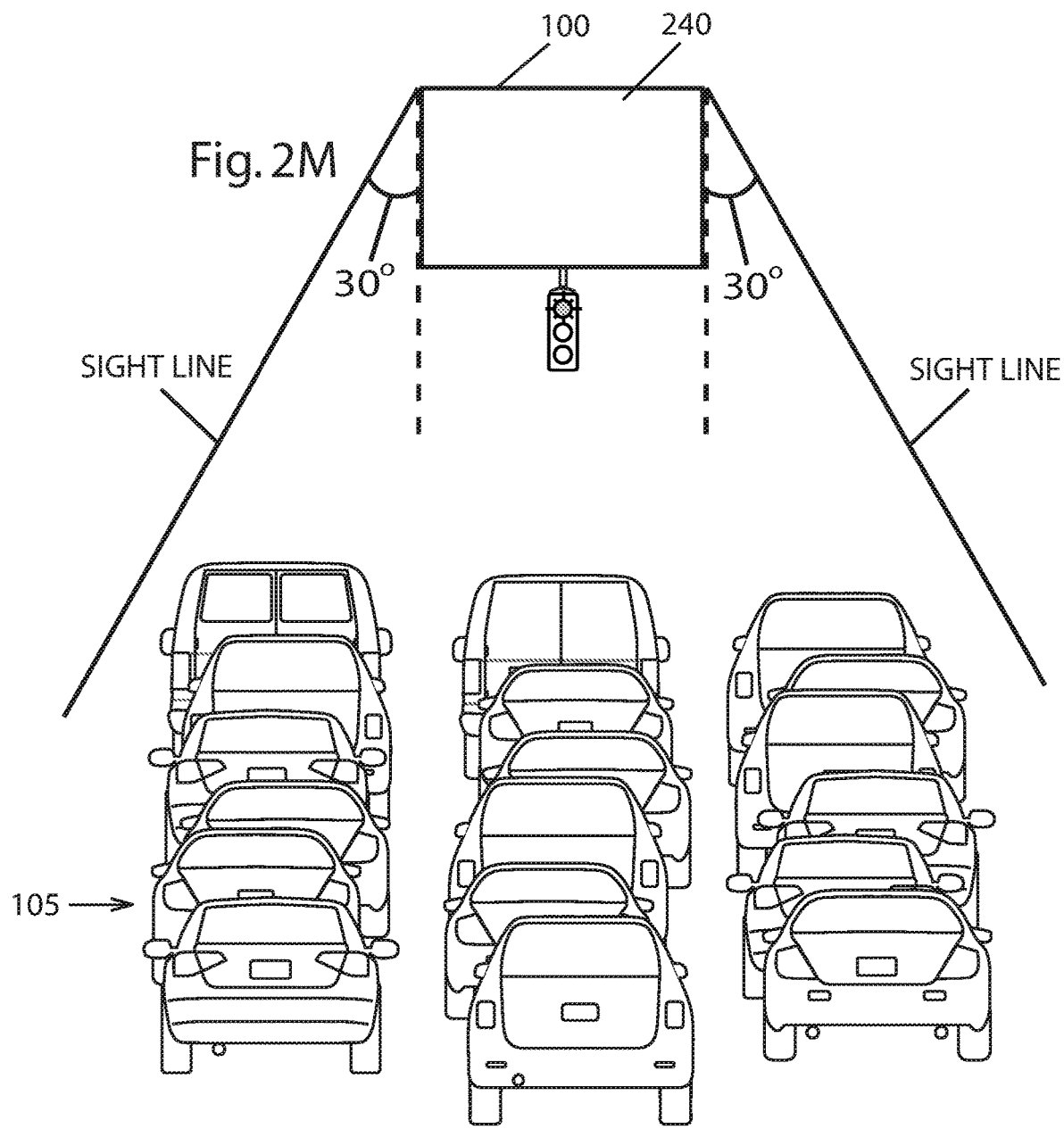

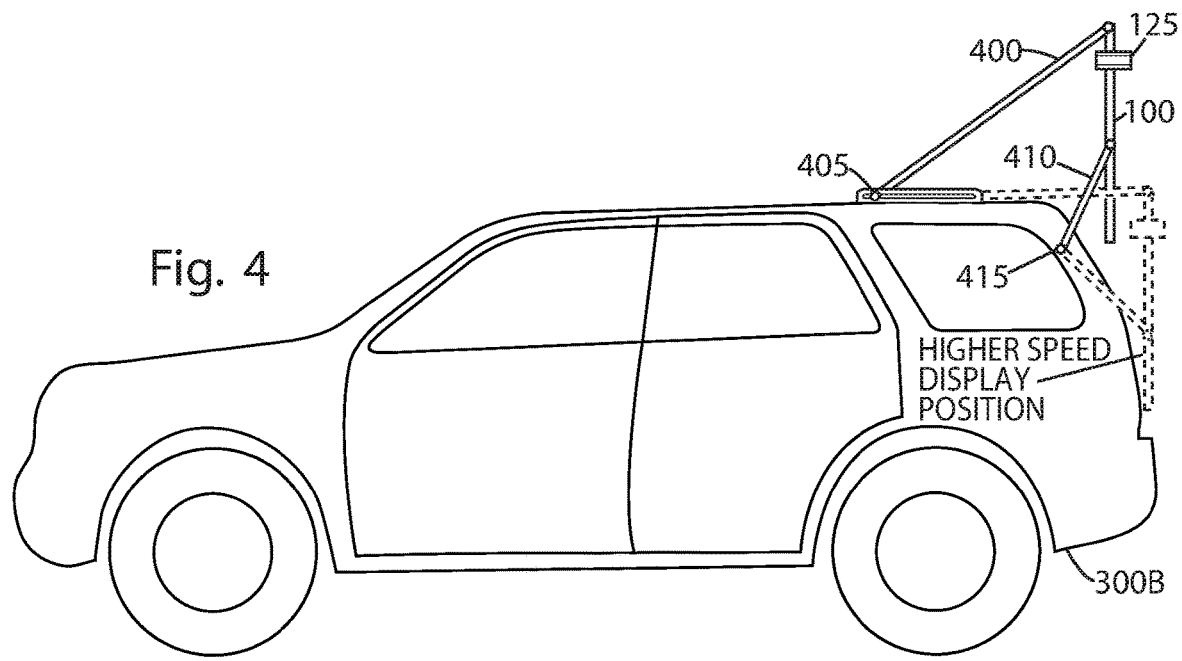
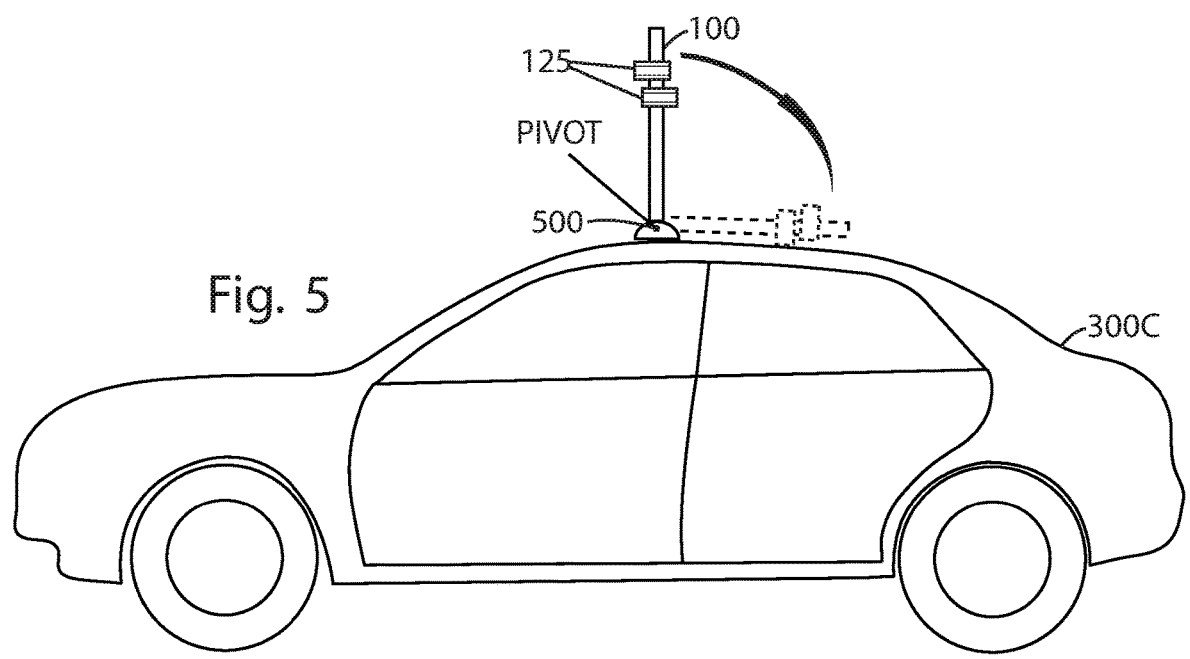

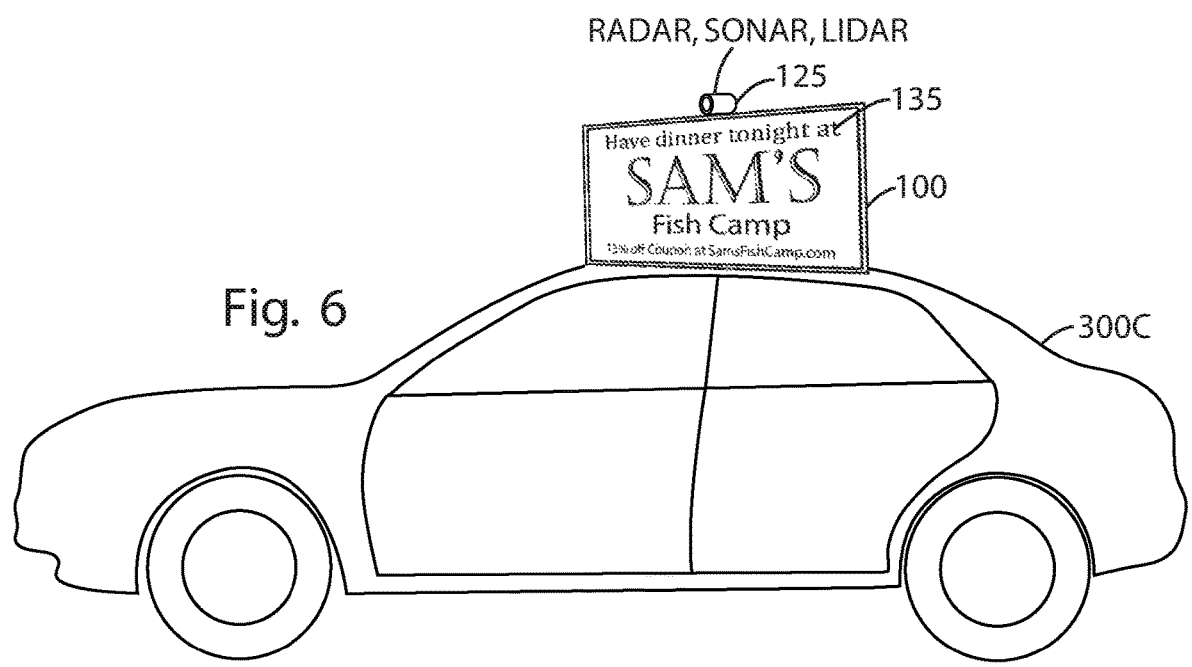

ACTIVE DISPLAY ON BUS

Fig. 8 — ACTIVE DISPLAY ON DELIVERY VAN
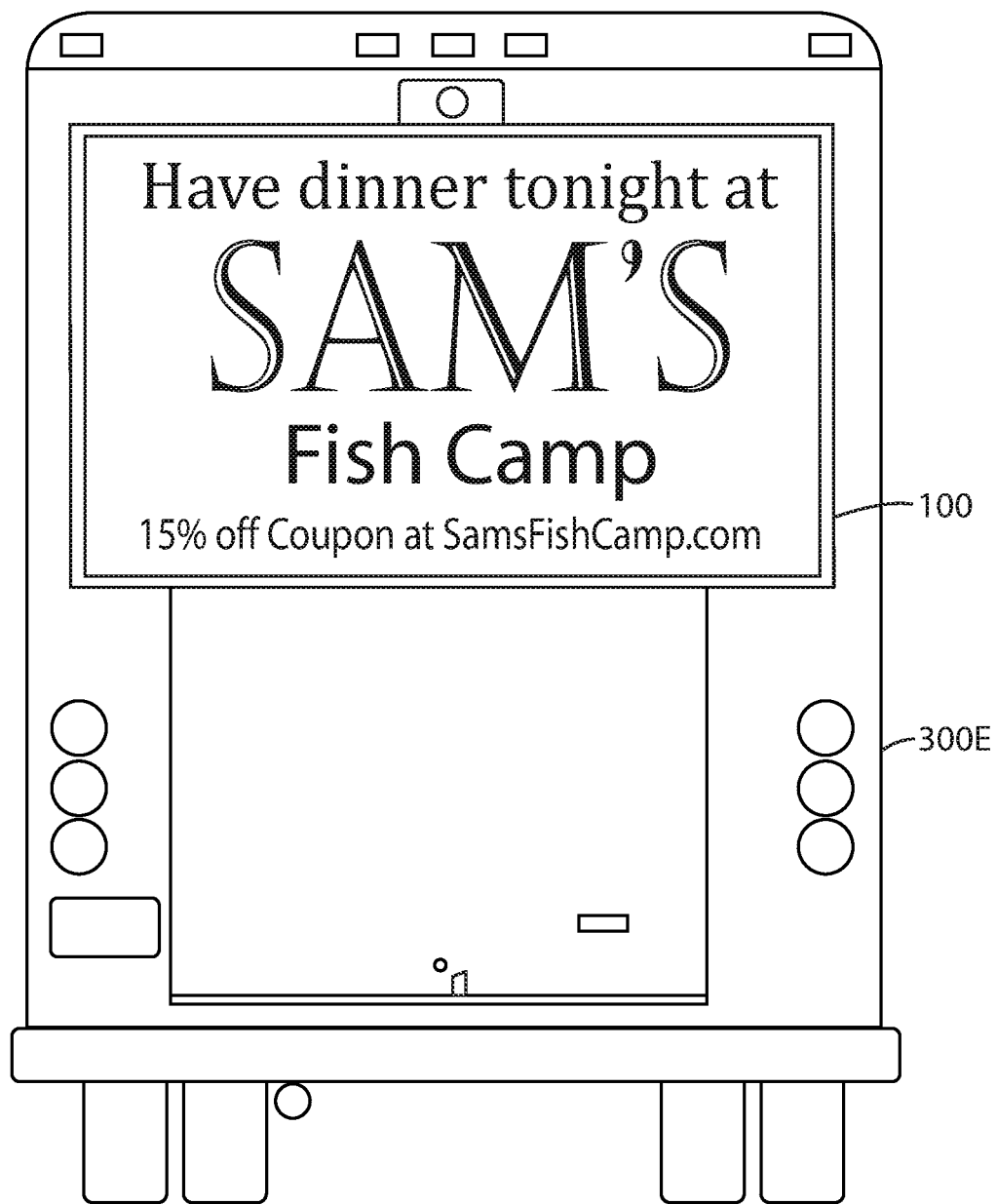

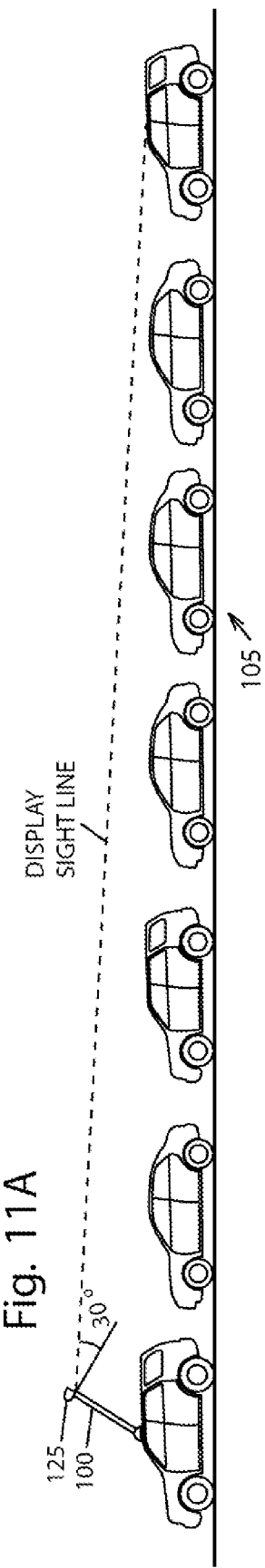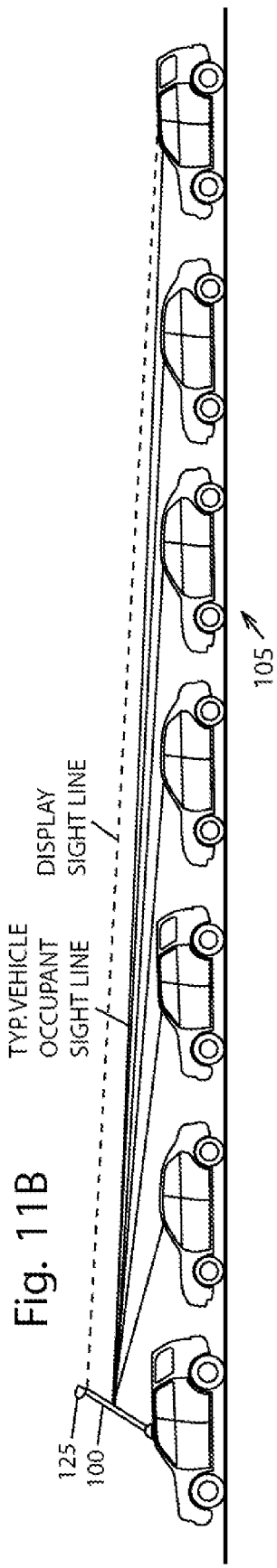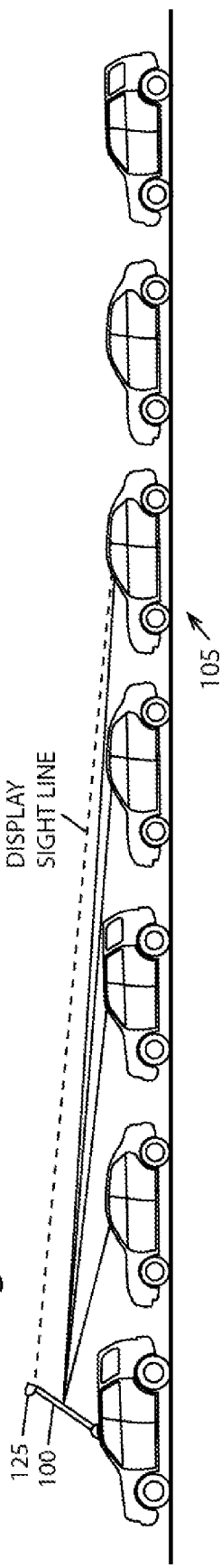

VEHICLE-MOUNTED, MOTION-CONTROLLED SIGN

CROSS-REFERENCE TO RELATED APPLICATIONS

This application is a Continuation-in-part of and claims priority to U.S. patent application Ser. No. 15/950,445, filed Apr. 11, 2018, which is a Continuation of and claims priority to U.S. patent application Ser. No. 15/363,540, filed Nov. 29, 2016 (now U.S. Pat. No. 9,972,230), which is a Continuation-in-part of and claims priority to U.S. patent application Ser. No. 14/657,570, filed Mar. 13, 2015 (now U.S. Pat. No. 9,607,510), which is a Continuation-in-part of and claims priority to U.S. patent application Ser. No. 14/022,141, filed Sep. 9, 2013 (now abandoned), which claims priority to U.S. Provisional Patent Application No. 61/699,992, filed Sep. 12, 2012, all of which are hereby incorporated by reference in their entireties.

BACKGROUND

Today's highly saturated television market makes it increasingly difficult for advertisers or businesses to reach their audiences in a cost-effective manner. The advent of cable, satellite television, and hundreds of channels, as well as the fast-growing popularity of digital video recorders, has induced merchants to spend more on advertising. However, the proliferation of media has lessened the number of viewers per medium and per advertising dollar. Studies show up to 40 percent of advertising is wasted and TV advertising's return on investment yields only 1 to 4 percent. Newspapers are in decline as well, as their advertising base dissipates with the digital age. Accordingly, there is a need for a cost-effective advertising solution.

BRIEF DESCRIPTION OF THE DRAWINGS

FIG. 1E is a block diagram showing an example operation of an example roadway sign, according to an embodiment of the present disclosure.

FIG. 2A shows an example roadway sign positioned beside a directional sign, according to an embodiment of the present disclosure.

FIG. 2H shows an operation of a display, according to an embodiment of the present disclosure.

FIG. 2I shows the operation of the display of FIG. 2H, according to an embodiment of the present disclosure.

FIG. 2J1 shows the operation of the display of FIG. 2H, according to an embodiment of the present disclosure.

FIG. 2J2 shows the operation of the display of FIG. 2H, according to an embodiment of the present disclosure.

FIG. 2K shows the operation of the display of FIG. 2H, according to an embodiment of the present disclosure.

FIG. 2L shows the operation of the display of FIG. 2H, according to an embodiment of the present disclosure.

FIG. 2M shows the operation of the display of FIG. 2H, according to an embodiment of the present disclosure.

FIG. 4 shows an example sign attached to a vehicle, according to an embodiment of the present disclosure.

FIG. 5 shows an example sign attached to a vehicle, according to an embodiment of the present disclosure.

FIG. 6 shows an example sign diagonally mounted atop a vehicle, according to an embodiment of the present disclosure.

FIG. 8 shows an example active sign on a delivery vehicle, according to an embodiment of the present disclosure.

FIG. 11A shows an example sign including a privacy filter, according to an embodiment of the present disclosure.

FIG. 11B shows the example sign of FIG. 11A, according to an embodiment of the present disclosure.

FIG. 11C shows the example sign of FIG. 11A, according to an embodiment of the present disclosure.

DRAWING REFERENCE NUMERALS

Figure 1A:
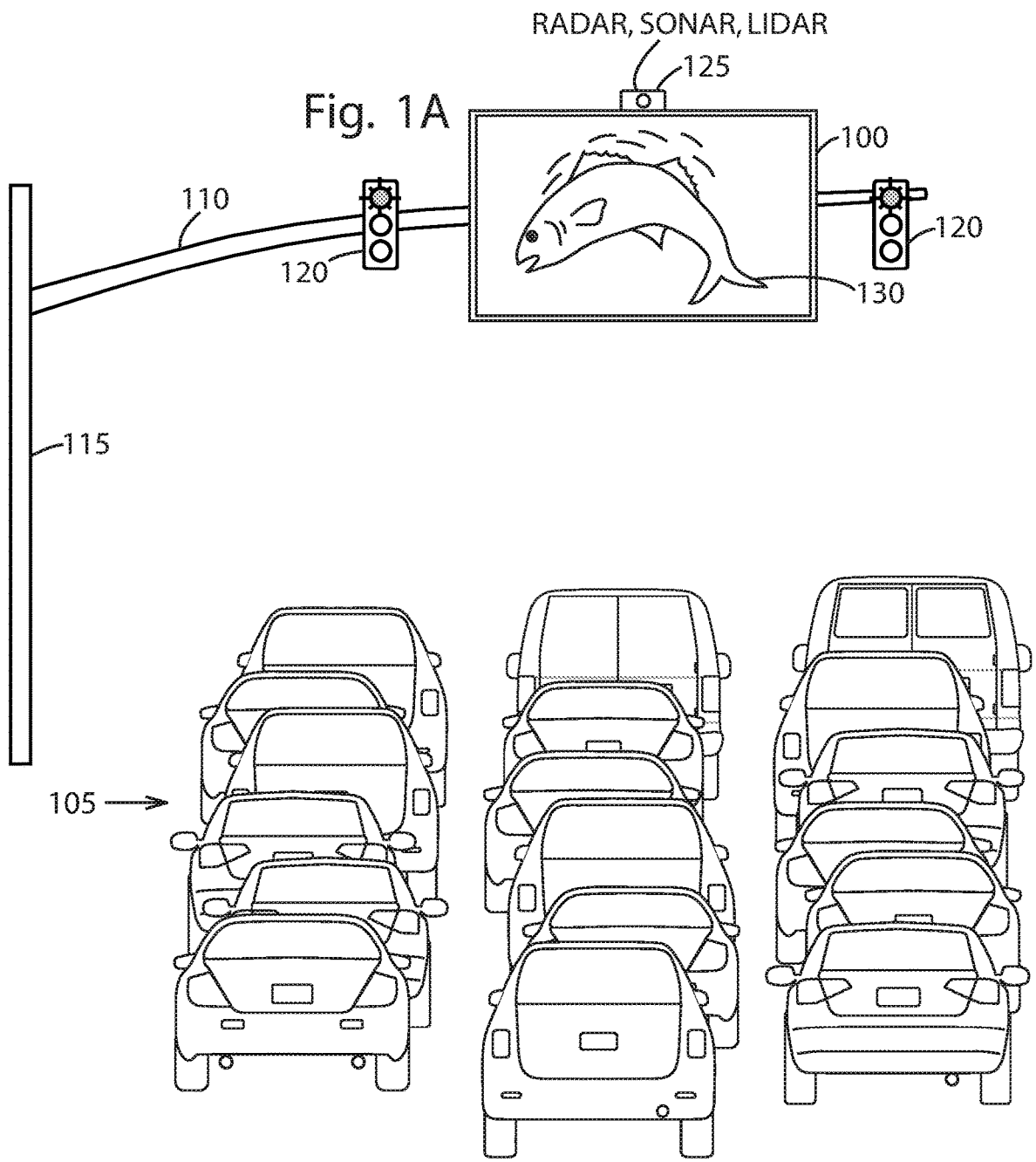
FIG. 1A shows an example roadway sign in an active condition, according to an embodiment of the present disclosure.

100 Sign
102 Traffic signal display
104 Countdown display
105 Traffic
110 Arm
115 Stanchion
120 Signal lights
125 Sensor(s)

130 Display
135 System
140 Data resource
141 Data link
142 External data link
143 External traffic control logic
145 Computer
146 Manual control
150 Memory
155 Advertising
170-190 Blocks
200 Roadway directional sign
202 Beam
205 Shutter
208 Sight line
210 Vehicle
212 Sight line
215 Vehicle
220 Vehicle recognition sensors
221 Subsurface sensor
222 Surface sensor
230 Solar panel
240 Privacy filter
250 Hinge
251 Frame
252 Drive assembly
253 Pinion
254 Curved gear rack
300 Vehicle
305 Hinge
310 Banner
315 GPS
320 Portion
325 Broadcast system
330 Transmitter
340-384 Blocks
400 Deflector
405 Hinge point
410 Pivot arm
415 Pivot point
500 Pivot
1000 Post
1005 Pivot
1010 Arm
1015 Pin
1020 Spring
1025 Slot

DETAILED DESCRIPTION

This application describes system(s) and method(s) for controlling content displayed on a billboard, display, or other sign. A sign according to this application may be mounted, disposed, or affixed above or adjacent to roadways, such as highways, freeways, and/or interstates. In some examples, the sign may be mounted or affixed to buses, trains, cars, trucks, motorcycles, trailers and/or other vehicles.

The sign may include a display that presents content such as advertisements, promotional offers, public service announcements, and/or notifications to drivers and/or occupants of vehicles. The content displayed by the sign may include static images, dynamic or periodically changing images, moving displays, videos, and/or any other visual content. Additionally, in some instances, the content may be a blank image (e.g., blue screen, black screen, etc.). When the sign is disposed on a vehicle, the vehicle may be stationary or may traverse or move through traffic to display content.

The sign may include mechanisms that maximize an advertising impact of the displayed content while minimizing potential driver distraction. For instance, the sign may include a screen, shutters, mechanical blinds, privacy filter or other structure that limits viewing of the sign to within a predetermined distance or range, or when conditions are otherwise unsafe. In other words, the privacy filter or other structure may limit viewing of the displayed content to drivers and/or occupants of vehicles within the predetermined range. In some instances, the predetermined range may be associated with a range of viewing angles at which the display, or the displayed content, is visible. The privacy filter or other structure may prohibit or limit occupants of vehicles outside the predetermined range (or viewing angle) from viewing the displayed content. Restricting the displayed content in this manner may minimize or prevent driver distraction. However, as the vehicles approach the sign and/or are within the predetermined range (or viewing angles), the driver and/or the occupants of the vehicles may be permitted to see the displayed content. In this manner, the sign may control viewing of the displayed content to within the predetermined range of the sign.

In some examples, the sign may include actuators, motors, or other mechanisms that adjust the predetermined range at which the displayed content is visible. As an example, an actuator may operably couple to the sign and change a height and/or an angle at which the sign is disposed relative to the roadway. The angle and/or height at which the sign is disposed may adjust the predetermined range at which the displayed content is visible. The actuator may therefore provide a convenient mechanism to alter the viewing angles at which the displayed content is visible, thereby controlling a visibility of the displayed content. Additionally, or alternatively, in some instances, the predetermined range at which the displayed content is visible may be adjusted through repositioning the privacy filter or other structure relative to the sign or otherwise adjusting a range of viewing angles that are visible through the privacy filter or other structure.

In some examples, sensors may monitor or detect speeds of the vehicles within a predefined proximity, vicinity, range, or distance of the sign. In some instances, the sensors may be integrated with or within the sign and/or may be separate from the sign. For instance, the sensors may be embedded into roadways, or may be placed on separate structures that are adjacent to the roadway on which the sign is disposed (e.g., post, gantry, traffic signal, vehicle, etc.). In some instances, the sensors may detect the speeds of the vehicles as the vehicles approach the predetermined range of viewing angles at which the displayed content is viewable, or may detect the speeds of the vehicles within the predetermined range of viewing angles at which the displayed content is viewable.

The sensors may include any type of sensors configured and/or arranged to detect speeds of the vehicles. In some instances, suitable sensors may include radar, sonar, lidar, infrared, acoustic (e.g., detect sound from passing vehicles), inductive or magnetic (e.g., wire embedded within the roadway that creates electrical current), microwave (e.g., sensor measures change in frequency of waves), infrared, video (e.g., video/image analysis to determine speed of vehicles), piezoelectric (e.g., piezoelectric sensor mounted or integrated into the roadway), and/or pneumatic (e.g., pneumatic road tube disposed across roadway). As noted above, these sensors may be integrated into the roadway, may be placed on a structure positioned beside a roadway, or a structure to which the sign couples (e.g., post, gantry, traffic signal, vehicle, etc.).

In some instances, the sign may output different content based at least in part on the speed of the vehicles. That is, based on the speed of the vehicles within the predetermined range of the sign, the sign may output different content on the display. As an example, in instances where vehicles are traveling at a high rate of speed, or are traveling faster than a predetermined threshold speed, the display may output static content (e.g., a static image, multiple sequential static images, etc.), may prohibit the output of content, may output slowly changing content, or may be made blank (e.g., black image, blue image, etc.). Outputting static or blank images in this scenario may prevent or minimize driver distraction. In other words, when the speeds of the vehicles are greater than the predetermined threshold speed, the sign may output less distracting or diverting content. Comparatively, in instances where vehicles are stopped, traveling at a lower rate of speed (e.g., creeping), or are traveling lower than the predetermined threshold speed, the display may output dynamic content, such as videos, motion-picture, changing or flashing displays. In this scenario, as vehicles are traveling at lower rates of speed, the risk of accident and the speed with which accidents may occur may be lower and, accordingly, the sign may output more dynamic or attention catching content.

In examples in which the sign mounts to a vehicle, the sign may include one or more sensors to determine speeds. For instance, a first sensor may determine the speed of the vehicle on which the sign is coupled, while one or more additional sensors may determine the speed(s) of the vehicles in oncoming traffic and/or traffic located behind the vehicle. Using these speeds (the speed of the vehicle to which the sign is mounted and the speed of the other vehicles relative to the vehicle to which the sign is mounted), the sign may determine the absolute speed(s) of the other vehicles and the sign may display static or dynamic content based upon such absolute speed(s) according to the techniques described above and elsewhere herein.

Sensors may also determine a number or quantity of vehicles within the predefined proximity, vicinity, distance, or range from the sign. In some examples, the sign may determine a finite number of vehicles, while in other examples, the sign may determine a ranges or approximations of quantity of vehicles (e.g., zero vehicles, 1-5 vehicles, 6-10 vehicles, 11+ vehicles, no vehicles, few vehicles, many vehicles, etc.). In some instances, the sensors may be integrated with or within the sign and/or may be separate from the sign to determine the number of the vehicles within the predetermined range or within the viewing angles of the display. For instance, sensors may be embedded or integrated into roadways, or may be placed on separate structures that are adjacent to the roadway (e.g., post, gantry, traffic signal, vehicle, etc.). In some instances, suitable sensors may include radar, sonar, lidar, infrared, acoustic (e.g., detects sound from passing vehicles), inductive or magnetic (e.g., wire embedded within the roadway that creates electrical current), microwave (e.g., sensor measures change in frequency of waves), infrared, video (e.g., video/image analysis to count the number of vehicles), piezoelectric (e.g., piezoelectric sensor mounted or integrated into the roadway), and/or pneumatic (e.g., pneumatic road tube disposed across roadway).

The sign may utilize the number or quantity of vehicles to determine to output different content on the display. For instance, the sign may output certain content based on the number of vehicles such that, upon detecting a specified number or quantity of vehicles within the predetermined range of the sign, the sign may cause certain content to be displayed. Determining the number of vehicles within the predetermined range from the sign may also be used to determine an average vehicle speed, which may be utilized to output certain content on the display (e.g., dynamic content or static content).

In some instances, the number of vehicles may also be utilized to determine a rate or value associated with displaying the content. For instance, a value associated with displaying an advertisement on the sign may be based at least in part on the number of vehicles within the predetermined range of the sign and/or a number of occupants of vehicles within the predetermined range of the sign. In other words, the number of vehicles within the predetermined range and capable of seeing the displayed content may affect a price associated with displaying the advertisement on the sign. As an example, in rush-hour traffic where a large number of vehicles are on the roadway, a value associated with displaying an advertisement on the sign may increase, as compared to the middle of the night or in the early morning where not as many vehicles are on the roadway. Accordingly, using the sensors to determine or count the number of vehicles, a value of displaying an advertisement on the sign may take into consideration the number of vehicles on the roadway or a number of occupants within the vehicles. In some examples, advertisers may be charged based on the actual measured number of impressions of an advertisement (e.g., a number of people that actually observed or were within range to observe the advertisement during the time in which it was displayed).

In some instances, the sign may utilize the speed of the vehicle(s) within the predetermined range of the sign, as well as the number of vehicles, when outputting content on the display. For instance, if a specified number of vehicles within the predetermined range of the sign are traveling greater than the predetermined threshold speed, the sign may display static content, may prohibit the output of content on the display, or the sign may be made blank. As another example, if a specified number of vehicles within the predetermined range of the sign are traveling less than the predetermined threshold speed, the sign may display dynamic content, such as videos, motion-picture, changing or flashing displays.

In some instances, the sign may include lifts, jacks, hoists, hydraulic cylinders, pneumatic cylinders, linear actuators, or any combination thereof to position of the sign relative to the roadway and/or to the vehicle to which the sign couples. In some instances, the sign may include one or more lifts to vertically and/or horizontally position or maneuver the sign above the roadway. When the sign is a vehicle-mounted sign, the lift(s) may raise and/or lower the sign above the vehicle to increase or decrease a visibility in front of, or behind the vehicle. Adjusting the vertical and/or horizontal position of the sign may affect the predetermined range at which the displayed content is viewable and/or the viewing angles at which the displayed content is viewable. Additionally or alternatively the sign may include an adjustment mechanism configured to adjust an orientation of the display screen relative to the vehicle or trailer to which it is mounted. In examples that include a lift, the adjustment mechanism may be part of, or separate from, the lift. The adjustment mechanism may be configured to rotate the sign about a vertical axis (e.g., rotation from side to front/back of the vehicle) and/or rotation about a horizontal axis (e.g., tilting the sign up or down to capture a range closer or further from the sign).

In some instances, the sign may be vertically adjusted based on the speed and/or the number of vehicles within the predetermined range of the sign. As an example, when a specified number of vehicles are traveling slower than the predetermined threshold speed, the sign may be lowered or deployed from a gantry disposed over the roadway to display content. Alternatively, when a specified number of vehicles are traveling greater than the predetermined threshold speed, the sign may retract or stow. In examples in which the sign is a vehicle-mounted sign, the sign may be deployed or raised when the speed of the vehicle to which the sign is mounted is at or below a threshold speed (e.g., 5 miles per hour, 10 miles per hour, etc.), and may be collapsed, retracted, or folded down, or otherwise lowered when the speed of the vehicle is greater than the threshold speed.

In some examples, the sign may display content that is tailored or targeted to one or more occupants of a vehicle that is within the predetermined range and/or viewing angle of the sign. For instance, the sign may include cameras and software to recognize license plates (rear and/or front) or other vehicle identifiers. In some instances, the cameras may be oriented to capture a license plate of a vehicle as the vehicle approaches the sign, such as when the vehicle is within the predetermined range of the sign. The software may utilize the license plate to determine an identity of a driver of the vehicle and/or information about the driver or other occupants of the vehicle (e.g., demographics, number of occupants, age of one or more occupants, gender, etc.). In some instances, the identity of the driver may be used to cross-index available email addresses, phone numbers, and/or user accounts. The email addresses and/or phone numbers may be utilized to determine characteristics of the driver. For instance, using an identification of the driver, the sign (or another communicatively coupled computing device) may determine preferences of the driver, a shopping or purchase history of the driver, and/or a browsing history of the driver. Utilizing this information, the sign may display targeted advertising directed to the driver. Additionally, or alternatively, the sign may utilize the location of the sign to display content advertising nearby restaurants, shops, or hotels that are proximate to the location of the driver.

Moreover, in some instances, the sign may employ facial recognition techniques to identify or determination information (e.g., demographics, number of occupants, age of one or more occupants, gender, etc.) about occupants of vehicles (e.g., the driver, passengers, etc.). In other embodiments, radio-frequency identification (RFID) tags may be used to obtain demographic information about the occupants of the vehicle. For instance, an RFID tag associated with a vehicle may be read by an RFID reader of the sign or in communication with the sign to retrieve information about the vehicle, driver, or other occupants. In some examples, the sign may include a global positioning system (GPS), and utilizing a known location of the driver, for instance, via their mobile phone, the system may display targeted content on the sign. In some instances, the sign may display the content and/or the sign (or another communicatively coupled computing device) may deliver the content to the mobile device of the driver. For instance, knowing the location of the sign and the location of the driver, the sign may display an advertisement for a restaurant located within the vicinity of the sign. This advertisement may be transmitted to the mobile phone of the driver as well and/or other occupants of the vehicle (e.g., by text message, email, an application on the driver's mobile phone, etc.). In some instances, the occupants of the vehicle may utilize the advertisements to make reservations (e.g., hotel, restaurant, etc.) and/or place orders (e.g., online retailers).

The sign may vary a brightness of the display depending on the time of day and/or a direction of the display. For instance, the sign may include a light sensor (e.g., photoresistor) that detects an ambient brightness (e.g., luminosity) and causes a brightness of the display to increase during bright daylight and decrease during period of lower ambient light (e.g., evening and nighttime hours). A clock may additionally or alternatively be included in and/or in communication with the sign and used to determine a time of day and/or determine a corresponding brightness of the display.

In some instances, the sign may be coupled to one or more solar panels to power components of the sign, such as the display and other electronic components of the sign. When the sign is mounted to the vehicle, the vehicle transporting the sign may include solar panels to power the sign. For instance, carrier vehicles, such as a semi-truck, may include solar panels disposed along a hood, roof, top, and/or sides of the vehicle and/or trailer that supply the sign with power.

The system(s) and methods according to this disclosure may also transmit radio transmissions (e.g., AM, FM, satellite, etc.), online audio, radio frequency transmissions (e.g., cellular, wifi, Bluetooth, etc.), or a speaker system to broadcast audio within the proximity or vicinity of the sign. In some instances, the audio may be related to and/or supplement the content output on the display.

These and other details are described further below with reference to drawings showing various example implementations.

Example Roadway-Mounted Sign

FIG. 1A illustrates a sign 100 positioned over a roadway on which vehicular traffic 105 travels. As shown, the sign 100 may be secured to an arm 110 of a stoplight stanchion 115. In some instances, the stanchion 115 may be located at an intersection, on ramp, off ramp, or other location where vehicles frequent and/or periodically stop. However, the stanchion may also be located along, over, or near other portions of the roadway.

In some instances, the arm 110 may include one or more signal lights 120 that direct or control a flow of the traffic 105. While FIG. 1A illustrates a particular location of the sign 100 on the stanchion 115, or relative to the signal lights (e.g., in between the signal lights 120), the sign 100 may be located adjacent to the signal lights 120, above the signal lights 120, or below the signal lights 120. Additionally, the stanchion 115 may include more than one sign 100.

The sign 100 may include one or more sensors 125 that detect speeds of vehicles in the traffic 105. In some instances, the sensor(s) 125 may detect an average or general speed of vehicles in the traffic 105, or the average or general speed may be computed based on speed measurements of individual vehicles. The sensor(s) 125 may provide a computer-sensible digital signal representative of the average or general speed of vehicles in the traffic 105. Additionally, or alternatively, as discussed herein, a vehicle recognition system may be used to determine the speeds of the vehicles within the traffic 105. The sensor 125(*s*) may include radar (radio detection and ranging), sonar (sound navigation and ranging), lidar (light detection and ranging), infrared, video, or another vehicle-sensing system that measure the speeds of the vehicles within the traffic 105.

The sensor(s) 125 may be affixed or coupled to the sign 100, the arm 110, and/or the stanchion 115. For instance, the sensor(s) 125 may be positioned atop the sign 100, on sides of the sign 100, a bottom of the sign 100, and/or may be built into the sign 100. Additionally, or alternatively, the sensor(s) 125 may be located on the roadway (e.g., embedded therein), positioned adjacent to the roadway on a shoulder and/or positioned above the roadway (e.g., post, gantry, traffic signal, vehicle, etc.).

The sensor(s) 125 may be oriented to detect the speed of the traffic 105 as vehicles approach or near the sign 100. As an example, the sensor(s) 125 may be arranged to detect the speed of the traffic 105 within about 100 meters of the sign 100. However, in other instances, the sensor(s) 125 may detect speed of the traffic 105 at other distances, such as within about 25 meters, 50 meters, or 75 meters of the sign 100.

The sign 100 includes a display 130 that displays visual images through the use of any display technology. The display 130 may include an array or discrete and organic light-emitting diodes (LEDs), or alternatively, may include a plasma screen, a liquid-crystal display (LCD), an electro-mechanical screen, a video projection screen, a micro-electrical mechanical systems (MEMS) projection display, etc. A brightness of the display 130 may be adjusted to accommodate a time of day. For instance, the display 130 may increase in brightness during periods of bright light (e.g., daylight) and decrease during periods of low light (e.g., at nighttime).

The sign 100 may be oriented over the roadway to be seen by vehicles and/or occupants in the traffic 105. The sign 100 may receive information or other data (e.g., image data, video data, etc.) to be displayed on the display 130. In some instances, the sign 100 may receive the data from a data source or data resource 140 (FIG. 1D) via one or more network connections, such as satellite, radio, television, Internet, and/or hard-wire. The data resource 140 may transmit information about the use of system 135 (or 135', FIG. 3B) and/or the sign 100 for billing and/or other informational purposes. For example, an amount of time the sign 100 displays a particular piece of content (e.g., advertising material) may be recorded, stored, and/or forwarded from the data resource 140 to one or more third-parties. The amount of time the sign 100 displays the piece of content may be used to determine a value associated with displaying the content. Accordingly, businesses may be billed for the amount of time their content was displayed on the sign 100.

Additionally, or alternatively, billing may be based on an algorithm that accounts for one or more weighted factors, including time of day, direction of exposed traffic, day of week, number of vehicles driving past the sign 100, holiday impact, local special events, weather conditions, location of the sign 100, demographics of the vehicle, the driver, and/or the occupants of the vehicle, geographical demographics, and/or the demand for advertising at a particular location of the sign 100.

Figure 1B:
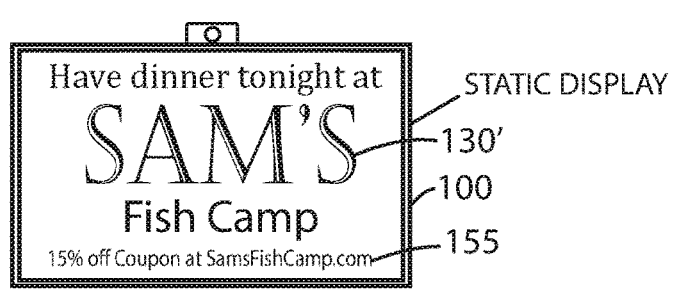
FIG. 1B shows an example roadway sign in a static condition, according to an embodiment of the present disclosure.

In FIG. 1A, the display 130 on the sign 100 may include a video or moving image (e.g., dynamic). In FIG. 1B a display 130' on the sign 100 may include a static image, such that the image on the display 130' does not change with time. In some instances, the display 130' may be blank in that no visible information is displayed or the display 130' may be illuminated to a particular color (e.g., grey, black, blue, etc.). In some instances, the display 130' may be blank or illuminated to the particular color when no paid advertising information is available, or when local authorities require this to be the case, for example.

Figure 1C:
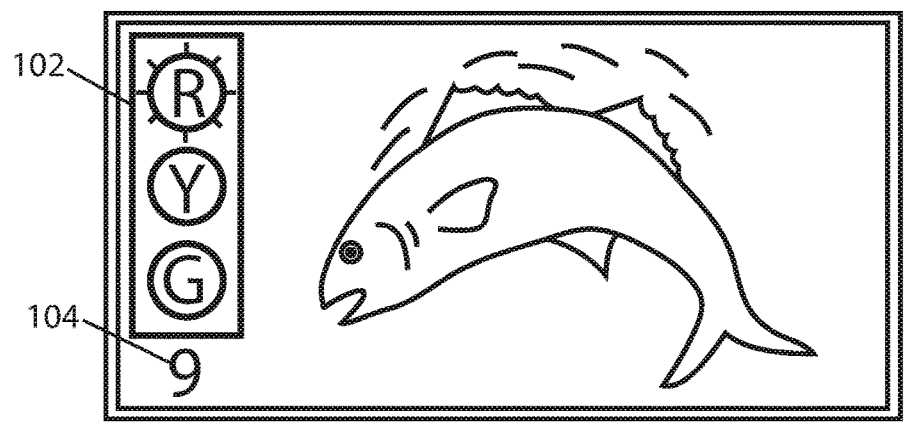
FIG. 1C shows an example roadway sign including a traffic stop light and a countdown timer, according to an embodiment of the present disclosure.

While the signal lights 120 in FIG. 1A is shown separate as being separate from the sign 100, in some instances, the signal lights 120 may be incorporated into the sign 100. For instance, as shown in FIG. 1C, the sign 100 may include a traffic signal display 102 having colored red, yellow, and green lights to indicate "stop", "caution", and "go" instructions to the traffic 105, respectively. The sign 100 may also include a countdown display 104 that indicates the time remaining in seconds until a "green" or "go" signal or until the traffic signal display 102 changes.

Figure 1D:
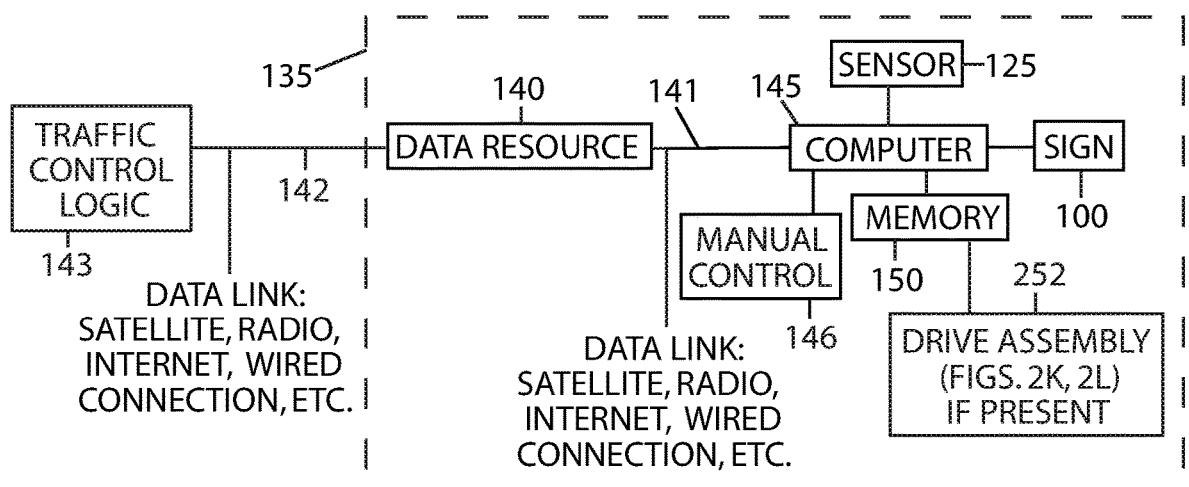
FIG. 1D shows an example system, according to an embodiment of the present disclosure.

FIG. 1D shows a system 135 that may be used in some instances for controlling the sign 100. The system 135 may be energized by local power mains or batteries. In some instances, the system 135 may include solar panel(s) 230 (FIG. 2D) that capture solar energy and power the system 135. In some instances, the system 135 may include a data resource 140, a computer 145, memory 150, the sign 100, and/or the sensor(s) 125. The data resource 140 may include programmed instructions for operating the sign 100 and the displays 130, 130' (FIG. 1A), etc. In some instances, the data resource 140 may represent a slave computer having memory that receives information from another communicatively coupled computer (e.g., server). The information may control an operation of the sign 100, broadcasts, and the like, from any remote source such as another computer connected via the Internet. The system 135 may include wireless and/or wired transceivers to provide an external data link 142, such as a satellite link, radio, Internet, or wired connection, that connects the data resource 140 to an external traffic control logic 143 that provides traffic signal control timing for the traffic signal display 102 and the countdown display 104. For instance, when the data resource 140 receives a "green" or "go" signal from the external traffic control logic 143, programmed instructions within the data resource 140 may cause the sign 100 to display a static image so that drivers of vehicles in the traffic 105 are not distracted.

The computer 145 contains a microprocessor or other logic that obtains information from the data resource 140 and stores the information in the memory 150. The computer 145 may retrieve the programmed instructions as needed, and at least one or more images for output on the displays 130, 130', as described below in connection with FIG. 3C. The computer 145 may also receive signals or other data representative of the speed of vehicles in the traffic 105 from the sensor(s) 125 as the vehicles approach the sign 100.

When the sign 100 is energized, the sensor(s) 125 monitors the speed of vehicles in the traffic 105 within a predetermined range and as the traffic 105 approaches the sign 100. The computer 145 may receive the speed (e.g., speed data) from the sensor(s) 125. When the traffic signal 120 is green or a specified number of vehicles reach a predetermined threshold speed, for example 40 km/h, the programmed instructions in the memory 150 may cause the display 130' (FIG. 1B) to be retrieved from the memory 150 and transmitted to the sign 100 for display. As noted above, the display 130' may be either a static image or blank and may be used when the traffic 105 is moving relatively fast and drivers may not have time to follow a moving advertisement (or other content) and/or may be unduly distracted. Conversely, upon receiving data from the sensor(s) 125 indicating the traffic 105 is moving relatively slowly or below the predetermined threshold speed, for example, 8 km/h or less, the computer 145 may retrieve the display 130 (FIG. 1A) from the memory 150 and may transmit the display 130 to the sign 100. The display 130 may be used at predetermined relatively low speeds, such as stop-and-go rush-hour traffic, when drivers may have time to safely observe moving or dynamic advertisements and/or are less or unlikely to be unduly distracted. Although speeds of 8 km/h and 40 km/h are used in the above example, other predetermined speeds may be used to present the displays 130 and 130', respectively.

In some instances, certain locales may legislate the speeds, times of day, etc. when the sign 100 may be active, display dynamic content (e.g., videos, flashing advertisements), display static content, and/or when the sign 100 is blank. In such instances, the system 135 may include a manual override control 146 that permits manual control of the sign 100 for emergencies and events (e.g., parades) so that officials may take control of the sign 100 in real time and/or for a predetermined period, after which the system 135 may be re-enabled. In some instances, the manual override control 146 may be a panel-mounted or hand-held rotary switch on the sign 100, or the equivalent. This information may be provided and controlled by the data resource 140.

The data resource 140 may send updated display information to the computer 145 at a predetermined rate so that displays 130 and 130' display available latest information (e.g., most recent or new advertisements). The display 130' may include subordinate or short-term advertising 155 as indicated in FIG. 1B. For example, an advertiser may offer discounts to attract business at slow times of the day, or during non-peak hours. If the traffic signal display 102 and/or the countdown display 104 are present, the external data link 142 (FIG. 1D) may receive signals from the external traffic control logic 143 and transmits these signals to the computer 145.

In some instances, optional short-range FM or other broadcasting may be broadcasted in conjunction with displaying the displays 130 and/or 130' and throughout the cycling of a moving and static or blank display.

FIG. 1E is a flowchart showing one aspect of operation of the present embodiment. Instructions for this mode of operation are contained in the memory 150 of the computer 145. At the start (block 170) the system 135 is energized. For instance, the system 135 may be powered by solar energy captured by solar panels. When manual override is selected by the manual override control 146, an operator may make a manual selection (block 174) to retrieve and display a static display (block 176), to retrieve and display a moving display (block 178), or to display a blank image on the sign 100 (block 180). If manual override is not selected (block 172), the computer 145 receives information regarding the speed of vehicles in the traffic 105 via the sensor(s) 125 (block 182). If the traffic 105 is moving faster than a predetermined threshold speed (block 184), the computer 145 retrieves and displays a static display from the memory 150 (block 186). If vehicles in the traffic 105 are moving at less than or equal to a predetermined speed (block 188), the computer 145 retrieves and displays a moving display from the memory 150. After a selection is made at each choice point (blocks 172, 184, and 188), control of this aspect of the program running in the computer 145 returns to the first choice, i.e., manual override (block 172). Operation of the sign 100 may continue in this manner until the sign 100 is de-energized.

FIG. 2A shows a roadway directional sign 200 accompanied by an advertising and/or informational sign 100. The sign 100 may be mounted beside the roadway directional sign 200 on a beam 202. As discussed above, in some instances, the sign 100 may include the sensor(s) 125 to detect the speed of the traffic 105. The sensor(s) 125 may also be configured to determine the direction of the traffic 105. The sensor(s) 125 may transmit speed data to the computer 145 (FIG. 1D), which determines whether the sign 100 displays the display 130 or the display 130'.

In some instances, the sign 100 may also display roadway information and/or other public service announcements, such as "Caution! Slow traffic for the next 5 miles" or "Amber Alerts."

Figure 2B:
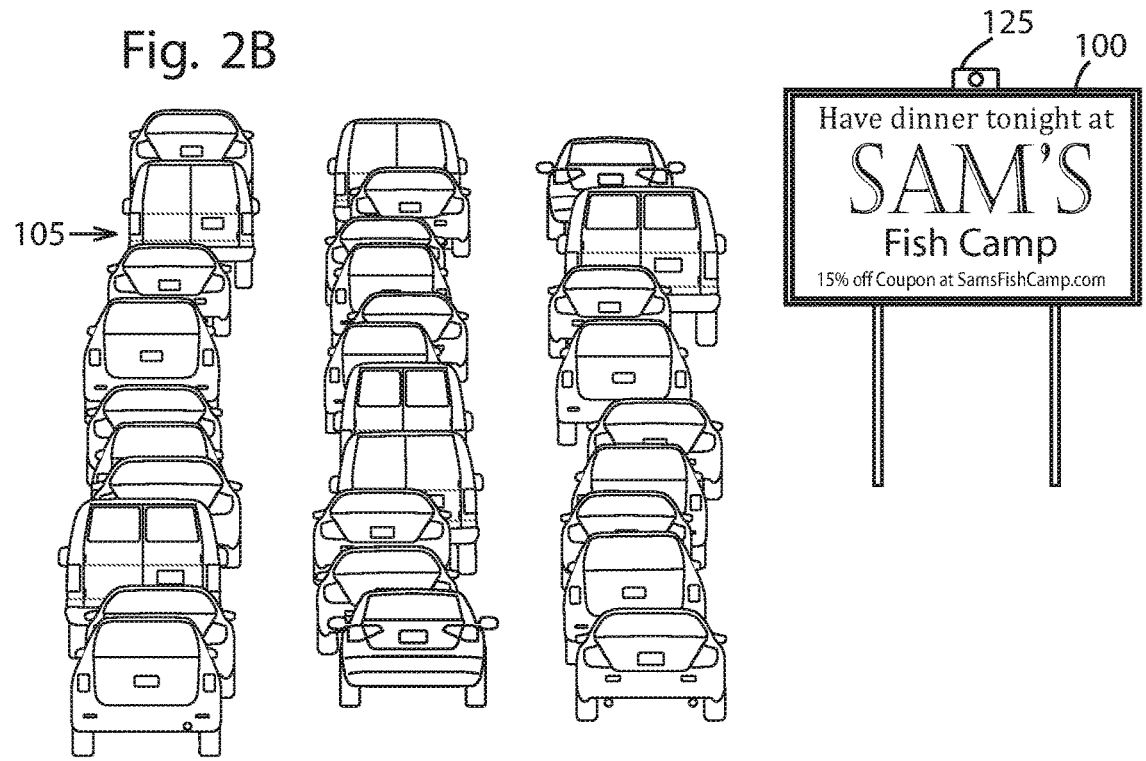
FIG. 2B shows an example free-standing roadside sign, according to an embodiment of the present disclosure.

FIG. 2B illustrates that instead of being placed overhead, the sign 100 may be mounted in a free-standing manner beside a roadway.

Figure 2C:
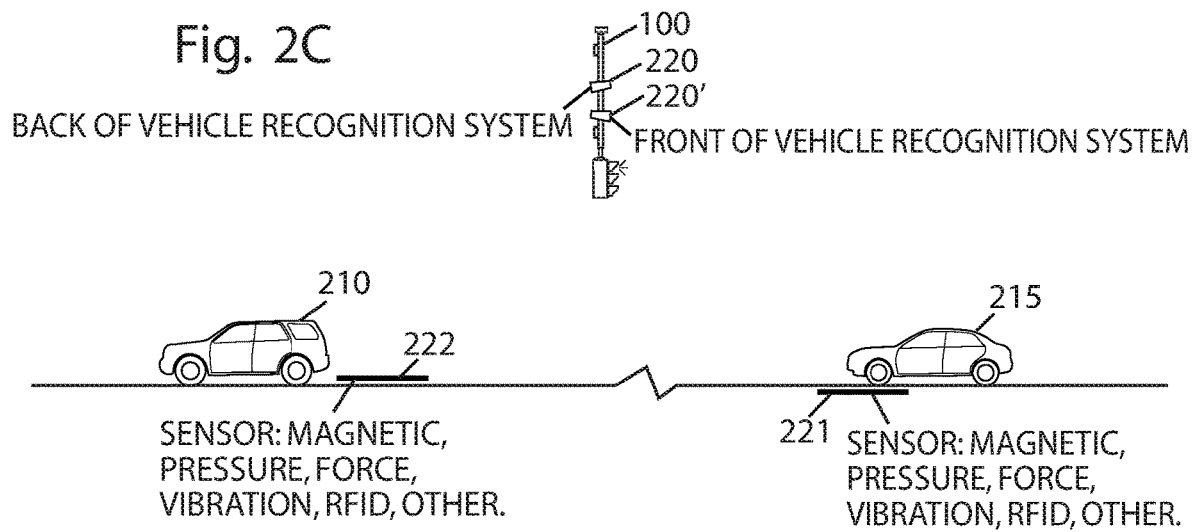
FIG. 2C shows a vehicle recognition system that may be usable with an example roadway sign, according to an embodiment of the present disclosure.

FIG. 2C shows the addition of vehicle recognition sensors 220 and 220' in the vicinity of the sign 100. In some instances, the vehicle recognition sensors 220 and 220' may be mounted on the sign 100 above the roadway, adjacent or on the side of the roadway, across the roadway, or integrated into the roadway. The vehicle recognition sensors 220 and 220' may include cameras and software to recognize license plates on vehicles. In some instances, the vehicle recognition sensor 220 is positioned or arranged to capture the rear license plate information after a vehicle 210 passes beneath the sign 100, while the vehicle recognition sensor 220' may be positioned or arranged to capture the front license plate information as a vehicle 215 approaches the sign 100. License plate information and the related model and year of the vehicles 210 and 215 may be used to determine driver demographics and deliver selective advertising. Additionally, vehicle ownership records may be cross-indexed with available email addresses, Internet addresses, and/or mobile devices to facilitate delivery of selective advertising. For instance, using the email address and/or the mobile phone number of the driver, the sign 100 and/or another communicatively coupled computing device may analyze a browsing or search history of the driver and determine content specific to the driver. The content may be displayed on the sign 100 and/or may be delivered to the mobile device of the driver. For instance, utilizing a browser history, the sign 100 and/or another communicatively coupled computing device may determine that the driver enjoys seafood. Using a location of sign 100, the sign 100 (or another communicatively coupled computing device) may determine that a seafood restaurant is nearby may display marketing material targeted to the driver. Additionally, or alternatively, the sign 100 and/or the system 135 may transmit coupons, reservation links, and/or other marketing material to the mobile device of the driver.

In some instances, cameras and software capable of scanning and recognizing license plates may include those manufactured by the Thales Group of Neuilly-sur-Seine Cedex, France, and Perceptics Imaging Technology Solutions of Knoxville, Tenn.

Additionally, or alternatively, the sign 100 and/or the system 135 may include facial recognition software to identify occupants of vehicles (e.g., driver and/or passengers) for gathering of demographics, determining targeted advertising material, transmitting coupons or reservation links to mobile devices of the occupants, and displaying the targeted advertising material on the sign 100.

The vehicle recognition sensors 220 and 220' may also include cameras or other sensors that detect and/or recognize license plates, windshield tags, radio-frequency identification (RFID) tags, or other vehicle identifiers that are usable to identify vehicles or their occupants and/or to determine demographic information about the occupants. In some instances, the vehicle recognition sensors 220 and 220' may be a part of the data resource 140 (FIG. 3B).

In addition to the vehicle recognition sensors 220 and 220', the sign 100 and/or the system 135 may include or employ additional sensors that count and provide information about passing vehicles. As an example, FIG. 2C illustrates subsurface and surface sensors 221 and 222, respectively, disposed on the roadway in which the vehicles 210 and 215 travel. The subsurface and surface sensors 221 and 222 may determine the number of vehicles that have entered a designated area adjacent to a stop light, for example, ten vehicles deep in three lanes, may determine the number of vehicles within a predetermined distance, vicinity, or range of the sign 100, and/or may determine the number of vehicles within the viewing angles at which a display of the sign 100 is viewable. In some instances, the subsurface and surface sensors 221 and 222 may also determine the speed of the vehicles within the predetermined distance or range of the sign 100.

The subsurface and surface sensors 221 and/or 222 may be communicatively coupled to the sign 100 and/or the system 135 to transmit data indicating the number and speed of vehicles in traffic 105. For instance, the subsurface and surface sensors 221 and 222 may be connected to the computer 145 (FIG. 3B) and transit data indicating the number and speed of vehicles in traffic 105. Upon detecting a specified number of vehicles the computer 145 may cause the sign 100 to be activated. In some instances, the computer 145 may cause the sign 100 to be activated based at least in part on the speeds of the vehicles being under the predetermined threshold speed. Additionally, or alternatively, the computer 145 may cause the sign 100 to be activated (e.g., display dynamic content) when the signal light is red, and deactivated (e.g., display static content, a blank screen, or no content) upon a green light.

In some instances, the subsurface and surface sensors 221 and/or 222 may include optical, magnetic, force, pressure, and vibration sensors. As noted above, although described herein as subsurface and surface sensors positioned on the roadway, the sign 100 and/or the system 135 may include sensors positioned or coupled to the sign 100 placed above the roadway and/or adjacent to the roadway (e.g., on the shoulder). In other instances, vehicle mounted black box systems and/or RFID tags that transmit vehicle data to roadside, road surface, or road-embedded sensors may also be used to determine a vehicle count within a defined area and/or demographically identify vehicle occupants. In some examples, the sensors may include magnetic sensors sold by the Honeywell Corporation of Morristown, N.J., USA, optical sensors and counting devices sold by Jamar Technologies, Inc., of Hatfield, Pa., USA.

Figure 2D:
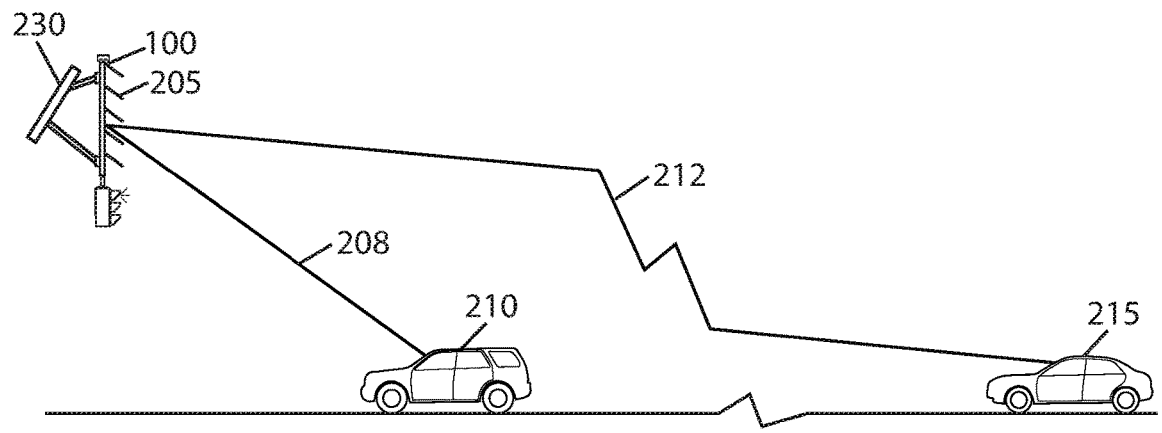
FIG. 2D shows an example roadway sign including shutters, according to an embodiment of the present disclosure.

FIGS. 2D-2I show selectively revealing a sign or portions of the sign 100 to viewers at predetermined distances. For instance, FIGS. 2D-2G show the sign 100 including a plurality of shutters 205 to selectively display content output by the sign 100. Additionally, FIG. 2D illustrates the sign 100 including the solar panel 230 to provide energy for powering the sign 100 and/or the system 135.

Figure 2E:
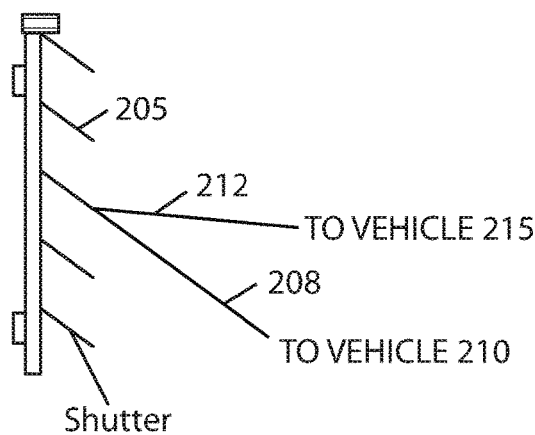
FIG. 2E shows the example roadway sign of FIG. 2D, according to an embodiment of the present disclosure.
Figure 2F:
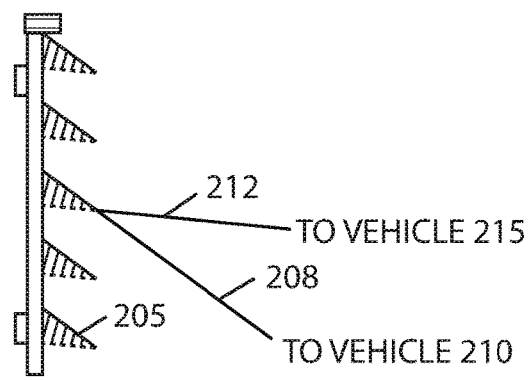
FIG. 2F shows the example roadway sign of FIG. 2D, according to an embodiment of the present disclosure.

FIGS. 2D-2F show two representative vehicles 210 and 215 located at different distances from the sign 100. For instance, vehicle 210 may be near or closer to the sign 100 than the vehicle 215. The shutters 205 may extend across a width of sign 100 and include a sufficient number, length, and angle with respect to the sign 100, such that occupants in the vehicle 210 are able to see images displayed on the sign 100. Alternatively, as the vehicle 215 is at a greater distance from the sign 100 than the vehicle 210, the shutters 205 may partially or completely block or prohibit the images displayed on the sign 100. That is, the shutters 205 may prevent occupants in the vehicle 215 from observing images displayed on the sign 100. As shown, a pair of sight lines 208 and 212 between the vehicles 210 and 215 to the sign 100 indicate the portions of display on the sign 100 that are visible.

FIG. 2E is a side view indicating the portions of sign 100 that are visible to occupants of the vehicles 210 and 215. In some instances, the sight lines 208 and 212 may meet and cross an outer edge of the shutters 205. The images displayed on the sign 100 may be visible to the occupants of the vehicle 210, while the cross-hatched regions under the shutters 205 may not be visible to occupants of the vehicle 215.

FIG. 2F is a side view of the sign 100 with cross-hatching, showing portions of the sign 100 that occupants of the vehicle 215 are not permitted to see.

Figure 2G:
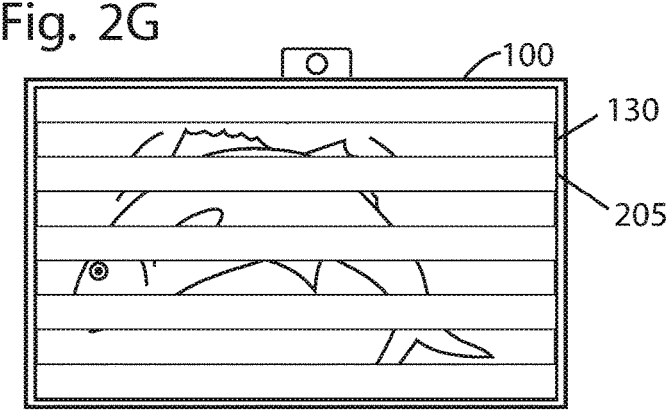
FIG. 2G shows a partial image displayed on the example roadway sign of FIG. 2D, according to an embodiment of the present disclosure.

FIG. 2G is a frontal view of the sign 100, showing portions of the sign 100 that are seen by occupants in the vehicle 215. As shown, the occupants in the vehicle 215 may be prevented from seeing an entirety of an image output on the sign 100.

In some instances, the viewing angles and/or viewing distance at which the image is viewable may be adjusted and/or modified through varying a number of shutters, a length of the shutters, and/or an angle at which the shutters 205 are coupled to the sign 100.

FIGS. 2H-2L show additional mechanisms to prevent an observer outside of a predetermined distance or range from the sign 100 from viewing the image on the sign 100. In other words, observers within the predetermined distance or range may be permitted to view the image on the sign 100. Those observers who view the sign 100 within a predetermined range of viewing angles, as measured in a vertical plane perpendicular to the sign 100, display panel, or surface of the sign 100 will be able to view the image output on the sign 100. As such, the enabled observers will be within the predetermined range from the sign 100, while observers who view the sign 100 from outside the predetermined range are outside the predetermined range of viewing angles and will not be able to see the image output on the sign 100.

FIGS. 2H-2J1 show a sign 100' that projects two different images, each at a predetermined angle with respect to the plane of a display of the sign 100'. In some instances, the sign 100' may utilize technology developed by Sharp Electronics, of Japan. This technology, called the "Sharp Dual Directional Viewing LCD" splits light into left-of-center and right-of-center images within the display of the sign 100'. A viewer positioned to the left-of-center of the display sees a first image, while a viewer positioned to the right-of-center of the display sees a second image. In this sense, the sign 100' may represent a dual directional viewing display that display multiple images. In some instances, the sign 100' presents two images that are displaced vertically from one-another. That is, observers at different vertical angles, and hence different distances from the plane of the sign 100', may see different images.

FIG. 2H shows the vehicles 210 and 215 and the sight lines 208 and 212. FIGS. 2I and 2J1 show the display 130 and the display 130', respectively, that are seen by occupants in the vehicles 210 and 215, respectively. The sight line 212 includes zigzag portions to indicate that the distance from the vehicle 215 to the sign 100' is compressed. The sign 100' may be tilted at a predetermined angle θ from a vertical or plane to enable selection or adjustment of the sight line angles for the vehicles 210 and 215. However, while FIG. 2H illustrates a particular angle of the sign 100', signs according to this application may be disposed at other angles, including vertical 90° from a horizontal axis or plane. Additionally, the sign 100' may provide a different number of sight lines, such as three sight lines, using a "Triple Directional Viewing LCD". The sign 100' may provide three sight lines, instead of two sight lines, for instance, to allow for greater viewing options. The signs, termed multi-directional viewing signs, may enable simultaneous viewing of a plurality of images, a blank screen, or a dark screen by occupants of vehicles at predetermined distances or angles.

The signs of the instant application may additionally or alternatively use a "Switchable Viewing-Angle Liquid Crystal Display" to provide a narrow viewing angle such that a viewer positioned to the left or right of center of the display sees no image, while a viewer positioned at or near the center at an approximate right angle to the display is able to view an image. An example of this directional viewable sign 100" is shown in FIG. 2J2 and is rotated 90° so that the directional viewable sign 100" is viewable by occupants of vehicles within a predetermined range of vertical viewing angles. For instance, the occupants of a vehicle 210', which is relatively close to the directional viewable sign 100", may view the display at relatively large vertical angle (nearly 90°) as measured from the plane of the directional viewable sign 100", and thus may see a displayed image. The directional viewable sign 100" may also be viewable by the occupants of the vehicle 210' when the vehicle 210' is within a range of other close distances or large angles (around 90°). However, occupants of a vehicle 215', which is relatively distant from directional viewable sign 100" and may be outside the range of viewable distances and angles, may view the directional viewable sign 100" at a relatively smaller vertical angle and thus may not be able to view the displayed image. In some instances, the directional viewable sign 100" may be mounted at any angle (e.g., about 40°) such that the viewable distance range may vary. In some instances, the directional viewable sign 100" may be disposed at an angle such that an image displayed by the directional viewable sign 100" may be viewable be from about 9 meters to about 21 meters, as measured from a position on the ground directly under the directional viewable sign 100". However, the image may be viewable at other distances from the directional viewable sign 100" through varying a height of the directional viewable sign 100" above the roadway and/or adjusting an angle at which the directional viewable sign 100" is disposed.

FIGS. 2K and 2L show a sign 100 with predetermined restricted viewing angles. While the directional viewable sign 100" in FIG. 2J2 illustrates the directional viewable sign 100" including an electronic technology to restrict viewing of a displayed image to within viewing angles and according to a viewer's distance from the directional viewable sign 100", FIGS. 2K and 2L show an instance employing a film or other screen overlaid on a sign. In some instances, the screen may be disposed at various angles relative to the sign 100 to restrict the viewing angles. For instance, viewing angles for the traffic 105 may be restricted by the use of a privacy filter 240, such as the model ALCF-P ABR2, sold by 3M Company, of Minneapolis, Minn., USA. In some instances, the privacy filter 240 may be placed in front of and/or parallel to the sign 100.

The privacy filter 240 may include a plastic film that contains a plurality of louvers. At large vertical angles (e.g., nearly 90° or perpendicular to the surface of the sign 100), most of the light from the sign 100 may pass through the privacy filter 240 so as to be viewable by observers within vehicles who are close to the sign 100. However, at smaller viewing angles that are relatively far from or perpendicular to the sign 100, the privacy filter 240 may block all or substantially all of the light from the sign 100. The image on the sign 100 may be selectively shown to vehicles nearer or farther away from the sign 100 by tilting the sign 100 to predetermined angles. For example, to allow vehicles close to the sign 100 to view the image (or other information) on the sign 100, the sign 100 may be tilted downward towards the roadway. Tilting the sign 100 towards the roadway may allow occupants within the vehicles to view the image as their line of sight is generally perpendicular to the sign 100. Alternatively, tilting the sign 100 upward may allow vehicles far from the sign to see the image on the sign 100.

In some instances, the privacy filter 240 may be oriented so that the sign 100 is visible by viewers who are relatively close to the sign 100 (e.g., 9 meters, 21 meters, etc.). However, as noted above, by tilting the sign 100 from a 43° angle to the ground or horizontal plane (FIG. 2K) to a 49° angle (FIG. 2L), for example, the image displayed by the sign 100 may become visible at greater distances.

FIG. 2M shows the privacy filter 240 oriented so that the image displayed by the sign 100 is visible over a horizontal angular range of 30° to either side of a plane perpendicular to the sign 100. In addition, more than one privacy filter 240 may be combined in series or overlapped and at right angles to each other so that the sign 100 is visible within a narrow region bounded by 30° vertical and horizontal. However, other angular ranges may be used.

According to the embodiments of the present disclosure, the sign 100 may be oriented vertically (so that the plane of the sign 100 is perpendicular to the plane of the roadway beneath) or at other angles than shown and discussed herein. For instance, in FIGS. 2K and 2L, the sign 100 may mount to a frame 251 that is secured to an arm 110 that extends from a stanchion (FIG. 1A), or may include another mounting arrangement that supports frame 251. A hinge 250 may be positioned at the lower edge of the sign 100, thereby connecting the sign 100 to the frame 251 and permitting the sign 100 to tilt downward at predetermined angles. A drive assembly 252 including a motor and gearbox may rotatably, hingedly, or pivotably connect to a pinion gear 253. In some instances, the drive assembly 252 may be secured to the frame 251 near or adjacent to the upper edge of the sign 100. A curved rack gear 254, having a radius of curvature equal to, or substantially equal to, the height of the sign 100 may attach or couple to the sign 100 at one end and may engage the pinion gear 253 on the drive assembly 252. When the drive assembly 252 is energized, the pinion gear 253 rotates and may rotate the plane of the sign 100.

The drive assembly 252 may be energized by instructions from the computer 145 (FIG. 1D). In some instances, when the drive assembly 252 includes a stepper motor, the angle of the sign 100 may be determined by counting the number of energizing pulses applied to the motor. With other types of motors, for example, a DC or an AC motor, a feedback mechanism such as a rotary encoder may provide this angular information to the computer 145. In some instances, the energy source used for the sign 100 may also power the drive assembly 252. Additionally, as noted above, one or more components of the system 135, such as the sign 100, may be powered via solar energy captured by the solar panel 230 and stored in one or more batteries.

In some instances, when the sign 100 is vertical or at 90° with respect to the roadway beneath, as shown in FIG. 1A, the sign 100 may be seen from the greatest distance (e.g., the maximum audience, by occupants in the traffic 105). In some instances, when tilted at 49° to the roadway, as shown in FIG. 2L, sign 100 may be seen by occupants in fewer vehicles, and when tilted at 43°, as shown in FIG. 2K, even fewer occupants are able to see the sign 100. However, the sign 100 may be tilted at any angle from 0 to 90° with respect to the plane of the roadway beneath. Additionally, this same arrangement may be used with the shutters 205 on the sign 100, as shown in FIGS. 2D-2G, with plain signs, such as in FIG. 1A, as well as the directional viewing sign 100, as shown in FIG. 2H.

Accordingly, the selection of the size of the viewing audience may be modified through modifying an angle at which the display of the sign 100 is viewable, which may be useful in maximizing display exposure at different times of the day. For example, during rush hour, if it is known that vehicles within a depth of ten vehicles will be stopped or slowly moving within six seconds of a red light, the sign 100 may be tilted so that its viewing range is limited to the depth of ten vehicles and then activated following those six seconds.

Example Vehicle-Mounted Sign

Figure 3A:
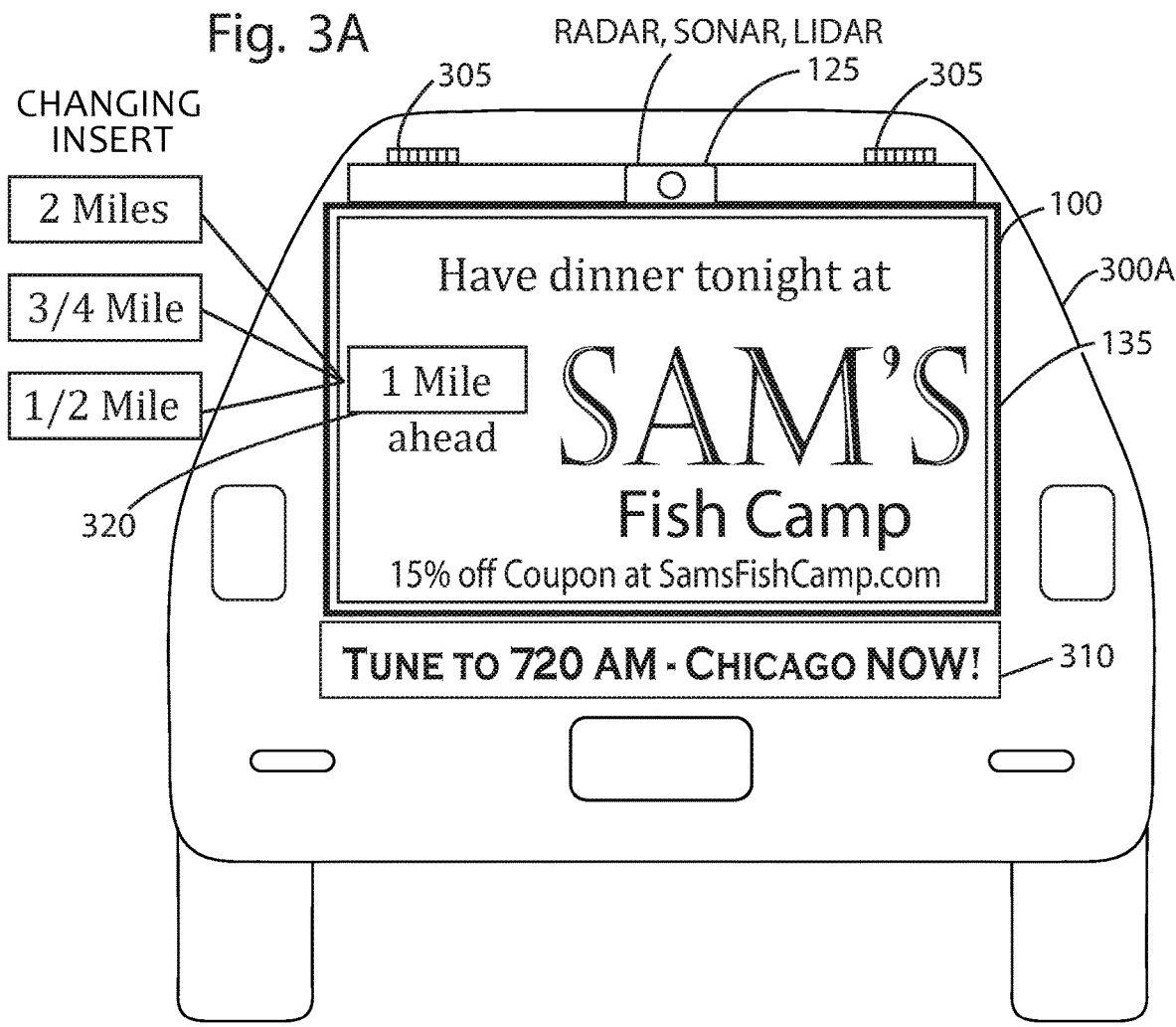
FIG. 3A shows an example vehicle-mounted sign, according to an embodiment of the present disclosure.
Figure 3B:
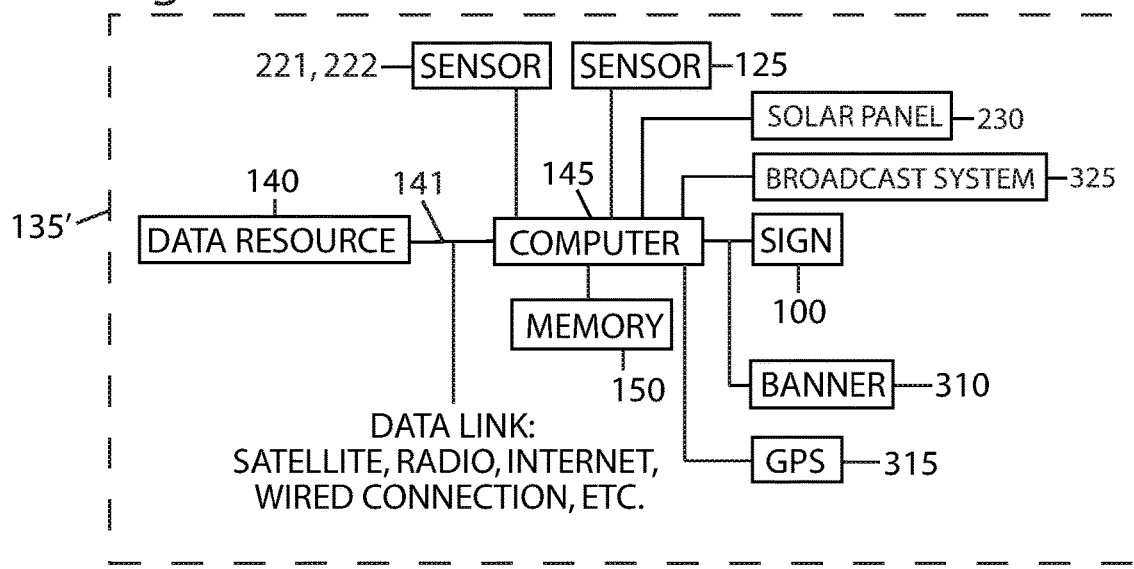
FIG. 3B shows an example system for use in moving vehicles, according to an embodiment of the present disclosure.
Figure 9A:
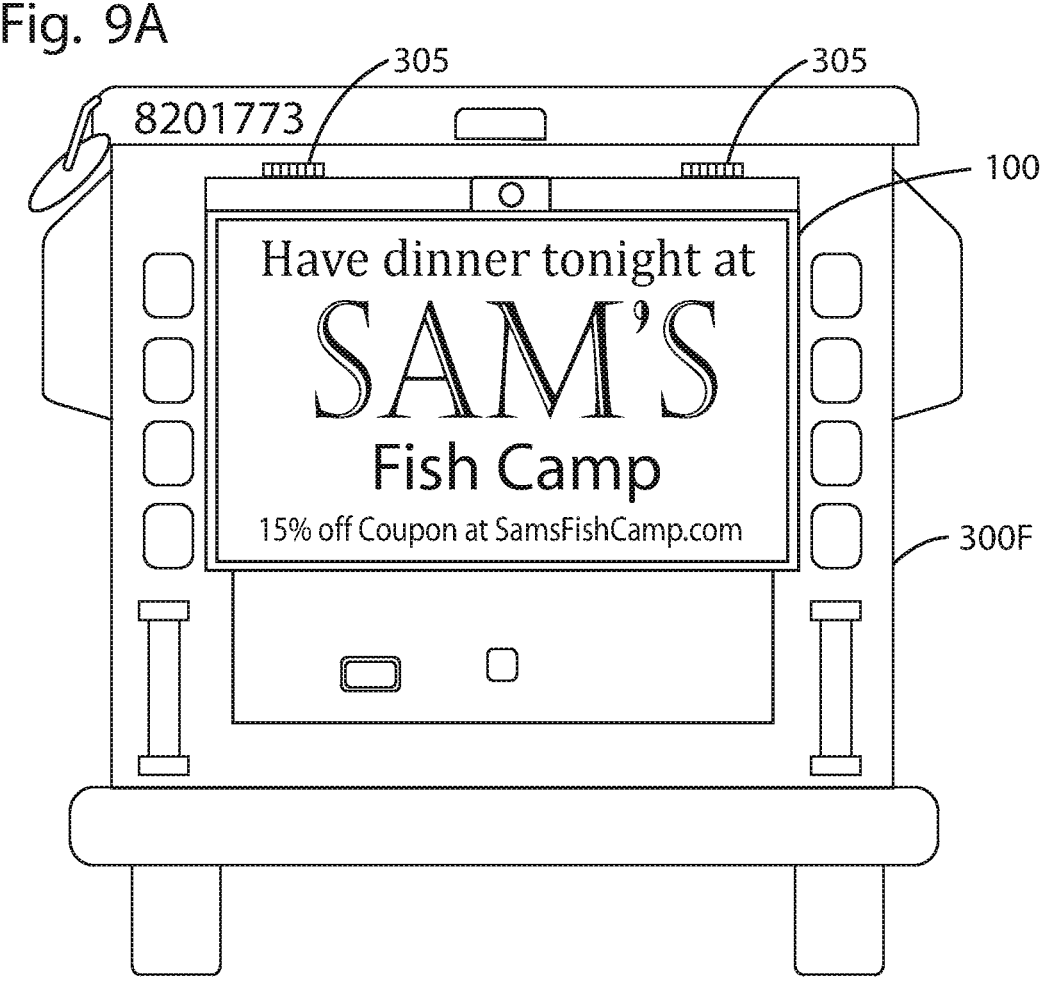
FIG. 9A shows an example swing-away sign mounted on hinges on a delivery vehicle, according to an embodiment of the present disclosure.

FIGS. 3A and 9A illustrate a sign 100 mounted, coupled, or disposed on a vehicle (e.g., bus, train, car, truck, etc.). In some instances, including the sign 100 on the vehicle and may provide additional targeted advertising capabilities. The sign 100 and/or the vehicle may include a global positioning system (GPS) to track a location of the vehicle and deliver location-based targeted advertising.

FIG. 3A shows a vehicle 300A with the sign 100. In some instances, the sign 100 may represent a swing-up sign mounted on the rear of the vehicle 300A. The sign 100 may optionally mount on the vehicle 300A by one or more hinges 305 that allow sign 100 to be lifted up and away from the rear of the vehicle 300A for access to a compartment or storage area at the rear of the vehicle 300A. In some instances, the sign 100 may be positioned fully downward, as shown in FIG. 3A, and may be secured by springs within a latching mechanism or the hinges 305. For instance, the springs may bias the sign 100 against the vehicle 300A such that the sign 100 is perpendicular to a roadway on which the vehicle 300A travels.

In some instances, the sign 100 and/or the vehicle 300A may include a banner 310. For instance, as shown in FIG. 3A, the banner 310 may affixed to the rear of the vehicle 300A, below the sign 100. In some instances, the banner 310 may display additional messages or content in a similar manner as the sign 100. Additionally, the banner 310 may also be displayed as a "crawler" or moving sign along the bottom of the sign 100. In some instances, the banner 310 may display time-sensitive information to direct a viewer to tune in to a short-range FM broadcast or select a particular radio station. However, the banner 310 may display other messages or content.

FIG. 3B shows an electronic control system 135', which in some instances, may include similar components or be similar to the system 135 (FIG. 1C). The system 135' may control the operation of the banner 310 and, in some instances, may receive location data from a GPS 315. The system 135' may also be powered at least in part by the solar panel 230. For instance, the solar panel 230 may be mounted atop a roof of the vehicle 300A and may generate power via solar energy.

In some instances, the system 135' may include a short-range FM, AM, and/or a broadcast system 325 (e.g., mobile device, cell phone, etc.) that transmits information associated with the display 130 on the sign 100. The information transmitted to a mobile device of the driver, may supplement an advertisement on the display 130 of the sign 100, for instance.

The GPS 315 provides location data to the computer 145 as the vehicle 300A travels from one location to another. The computer 145 may receive location-specific information from the data resource 140 and may cause the sign 100 and/or the banner 310 to display content in either a moving or static form. For instance, the sign 100 and/or the vehicle 300A may include the sensor(s) 125 configured to detect speeds of vehicles within a certain vicinity or range of the sign 100 and/or the vehicle 300A. The sensor(s) 125 may be arranged to detect speeds of oncoming traffic (e.g., in a direction the vehicle 300A travels) and/or speeds of traffic located behind the vehicle 300A.

In some instances, the sign 100 may include additional sensors to determine a speed at which the sign 100 is traveling, or may communicatively couple to the speedometer of the vehicle 300A. Depending on the speed of vehicle 300A and/or the other traffic 105 (FIGS. 1A, 2A, and 2B) in a vicinity of the sign 100, the sign 100 and/or the banner 310 to display content in either a moving form (e.g., periodically changing) or a static form (e.g., blank or visual).

In addition, in some instances, a portion 320 of the display 130 on the sign 100 may be devoted to displaying location-sensitive information, such as proximity or distance to a business or other venue associated with advertisements being displayed on the sign 100.

Figure 3C:
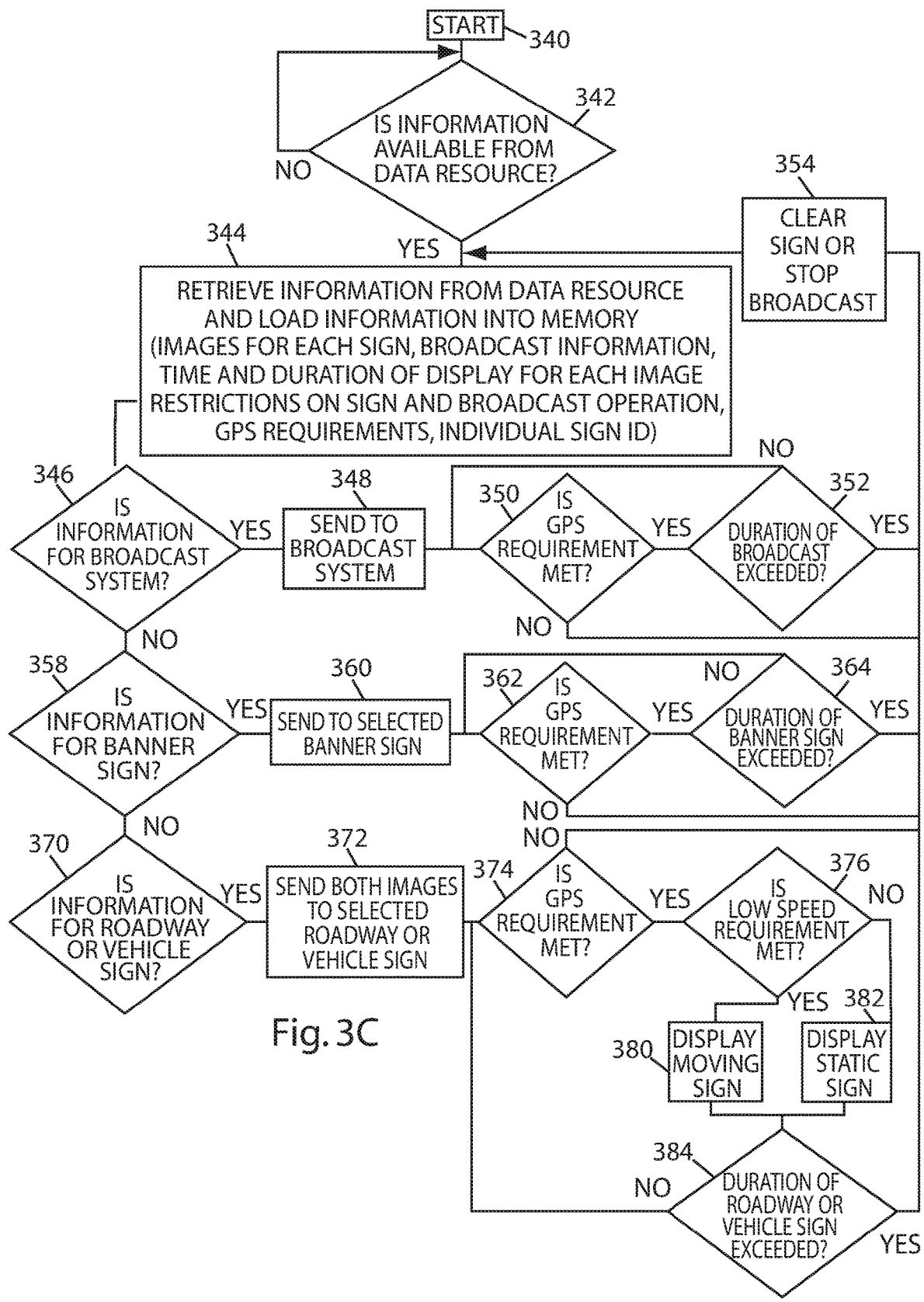
FIG. 3C is a block diagram showing an example operation of an example vehicle-mounted sign, according to an embodiment of the present disclosure.

FIG. 3C is a flow chart showing the operation of the system 135' according to one or more embodiments of the present disclosure. In this example, the system 135' may connect to one or more sign or broadcasting module discussed previously (e.g., a broadcast system, a banner, a roadway sign, and/or a vehicle sign). After being energized (block 340), the computer 145 may periodically determine an availability of data from the data resource 140, for example. In some instances, the computer 145 may periodically determine the availably of data once per day, every three hours, at midnight, or any other time the data resource 140 and/or the system 135' are operative (block 342). This determination may be done via a data link 141 (FIGS. 1C and 3B) that connects the computer 145 to the data resource 140 (e.g., satellite, radio, internet, wired connection, and the like). When data is available from the data resource 140, the computer 145 may download the data via the data link 141. Upon being downloaded, the data may be stored in memory 150 (bock 344).

The computer 145 may determine whether the information received is for a broadcast system (block 346) and if so, may send the information to the broadcast system 325 (block 348). When information for a broadcast is sent to the broadcast system 325, the system 135' may determine if the GPS requirement contained in the information is met (block 350). For instance, the system 135' may determine whether the broadcast system 325 is located within parameters supplied by the advertiser and relayed through the data resource 140. If this is true, the system 135' may determine whether the duration of the broadcast has been exceeded (block 352). If the duration of the broadcast has not been exceeded, control may revert to block 350 and loop through blocks 350 and 352. This process may continue until either the GPS requirement is not met (i.e., the vehicle 300A is outside the predetermined advertising area) or the predetermined duration of the broadcast has been exceeded. In either case, if the GPS requirement is not met or the duration of the broadcast has been exceeded, control may advance to block 354 and the broadcast is stopped. After the broadcast is stopped, control may revert to memory 150 to determine if additional broadcasts are stored and ready for use.

In some instances, the sign 100 may operate similar to that for the broadcast. For instance, the computer 145 may continually check the GPS and duration requirements of the broadcast system (blocks 350 and 352) and/or the computer 145 may determine if memory 150 contains new information (block 358) for the banner 310 (FIG. 3A). If so, this information is sent to the banner 310 (block 360). As described above, the GPS and duration requirements are tested (blocks 362 and 364). When the GPS requirement is not met and/or the required duration of the banner 310 has been exceeded, control may advance to block 354, the banner 310 may be cleared (e.g., output blank image or prohibit display), and the memory 150 may be checked for new information.

While the computer 145 may determine the requirements for the banner 310 and/or the broadcast system 325, the computer may also determine if information is available in the memory 150 of the computer 145 (block 344) for a roadway or vehicle sign 100 (block 370). If the information is for a roadway or vehicle sign, the information, including both static and moving images, may be sent to the sign (block 372). In some instances, the GPS requirement is determined (block 374) and the computer 145 may also determine whether the speed of the vehicles in the traffic 105 is below the predetermined threshold speed (block 376), as discussed above. If the speeds (or an average thereof) of the vehicles are greater than the predetermined threshold speed, such that one or more vehicles are moving faster than the predetermined threshold speed, the sign 100 may output (block 382) the display 130' (FIG. 1A, for example). Alternatively, if the speeds (or an average thereof) of the vehicles are lower than the predetermined threshold speed, such that one or more vehicles are traveling at less than the predetermined threshold speed, the sign 100 may output (block 380) the display 130. Additionally, a duration the sign 100 displays the display 130' and/or the display 130 may be compared against a duration. If the predetermined duration for displaying either the display 130' or the display 130 is exceeded, control may advance to block 354 and the sign 100 may prohibit display of the content. The sign 100 may therein be readied for a next display or advertisement. However, if the duration of displaying the display 130' or the display 130 is not exceeded, control may return to block 374 and the process may loop through blocks 376, 380, 382, and 384 until the duration is exceeded and/or the GPS requirement is no longer met.

The system 135' may, in some instances, operate in the same manner as the system 135, with the addition of the GPS 315. The above is illustrative of one example of many aspects possible with this embodiment. For instance, the actual programming steps are determined by conditions at the location of the sign 100, advertising demand, local restrictions, and the like.

FIG. 4 shows a sign 100 mounted atop a vehicle 300B. In some instances, the sensor 125 may be positioned at or near a top of the sign 100 and may face towards the rear of the vehicle 300B. The sign 100 may be secured to one or more bars and/or deflectors 400 on a roof of the vehicle 300B via a slidable pivot 405. A pivot arm 410 may attach or couple to the side of the sign 100 at a first end and a pivot point 415 on the vehicle 300B. The pivot arm 410 may also attach or couple to another side of the sign 100 at a second end and a pivot point on the vehicle 300B.

As shown in FIG. 4, the sign 100 may be movable between an elevated position and a lowered position. The elevated position of the sign 100 is shown in solid lines, while the lowered position of the sign 100 is shown in dashed lines. As the sign 100 moves up and down, between the elevated position and the lowered position, the sign 100 may be secured in a vertical position by the pivot arm 410. In some instances, the sign 100 may be in the elevated position when the vehicle 300B moves at speeds below a predetermined threshold, and may be in the lowered position above when the vehicle 300B moves at speeds above the predetermined threshold. In some instances, the sign 100 may transition between the elevated position and the lowered position via a hydraulic or pneumatic cylinder, a motor, actuators, or the like. The system 135 or 135' may control the raising and lowering of the sign 100 on the vehicle 300B.

FIG. 5 illustrates an alternative mounting of a sign 100 on a vehicle 300C, showing that the sign 100 may be movable between an elevated position and a lowered position. The elevated position of the sign 100 is shown in solid lines, while the lowered position of the sign 100 is shown in dashed lines. In some instances, the sign 100 may transition between the elevated position and the lowered position via a pivot 500. The sign 100 may transition between the elevated position and the lowered position via several mechanisms. For example, the pivot 500 may contain a spring that allows the sign 100 to pivot downward when a speed of the vehicle 300C exceeds a predetermined threshold. Additionally, or alternatively, a motor or cylinder may be used, as discussed in connection with FIG. 4 to raise and lower the sign 100.

In some instances, the sign 100 may face forward with respect to the vehicle 300C, so as to present content to oncoming vehicles, or may face rearward with respect to vehicle 300C to present content to vehicles located behind the vehicle 300C. In some instances, the vehicle 300C may include multiple signs, where one sign faces forward and another sign faces rearward. The sign(s) 100 may be controlled by the system 135 or 135', as described above.

FIG. 6 illustrates a sign 100 mounted diagonally on a vehicle 300C. The sign 100 may be oriented to face opposing traffic and the display 130 may be active when traffic is stopped or moving below the predetermined threshold speed. For instance, the sensor(s) 125 may determine that the speed of oncoming traffic is below the predetermined threshold speed and the sign 100 may present the dynamic display. In some instances, a second sign 100 may be added and oriented to face traffic on an opposite side of the vehicle 300C. Additionally, or alternatively, a third sign 100 may face toward the rear of the vehicle 300C. In some instances, each sign may be equipped with a respective sensor(s) 125 to sense speed and/or may receive independent data feeds from the system 135 (FIG. 3B).

Figure 7:
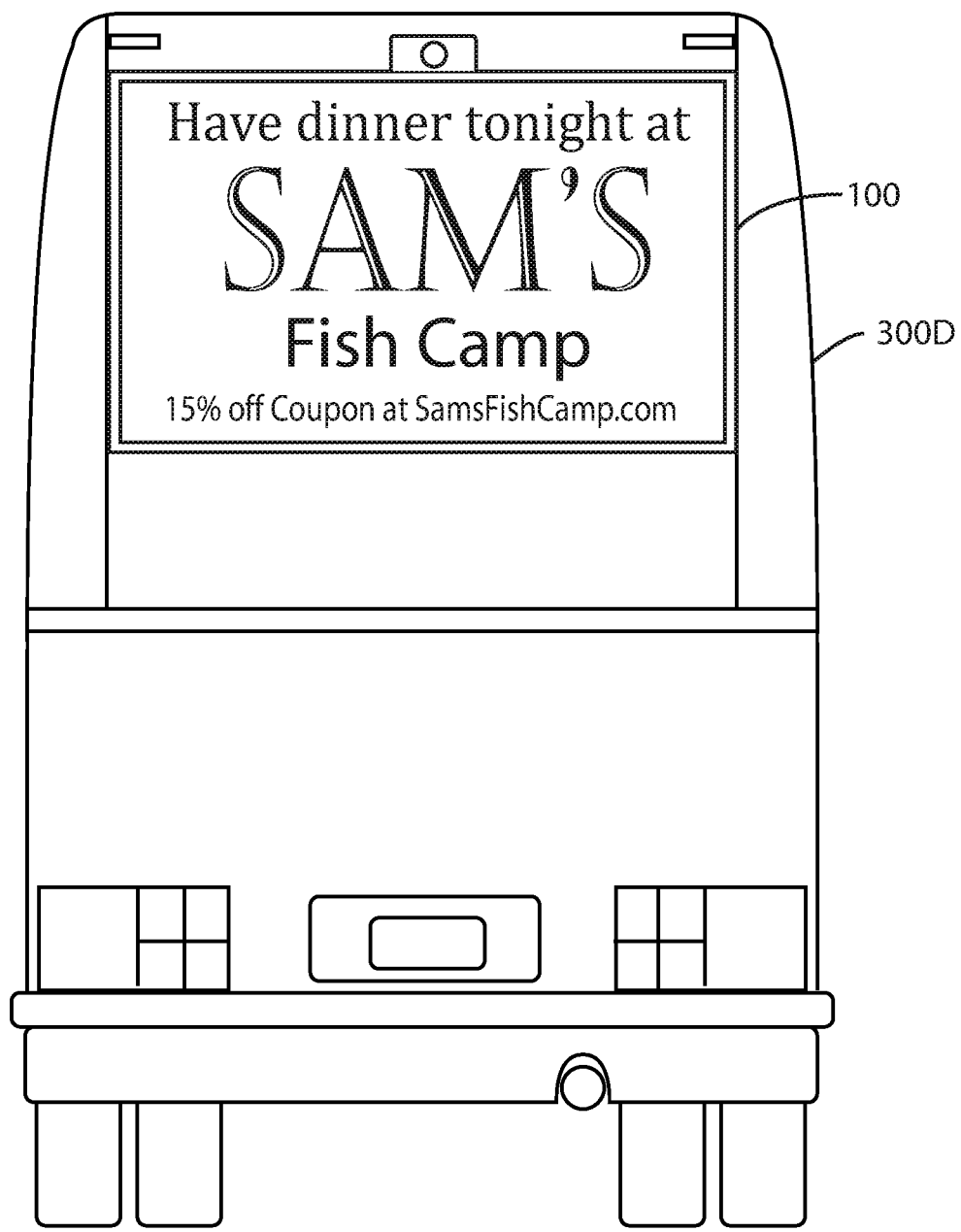
FIG. 7 shows an example active sign on a bus, according to an embodiment of the present disclosure.

FIGS. 7 and 8 illustrate a sign 100 mounted or coupled to the rear of a bus or recreational vehicle 300D and a delivery vehicle 300E, respectively.

Figure 9B:
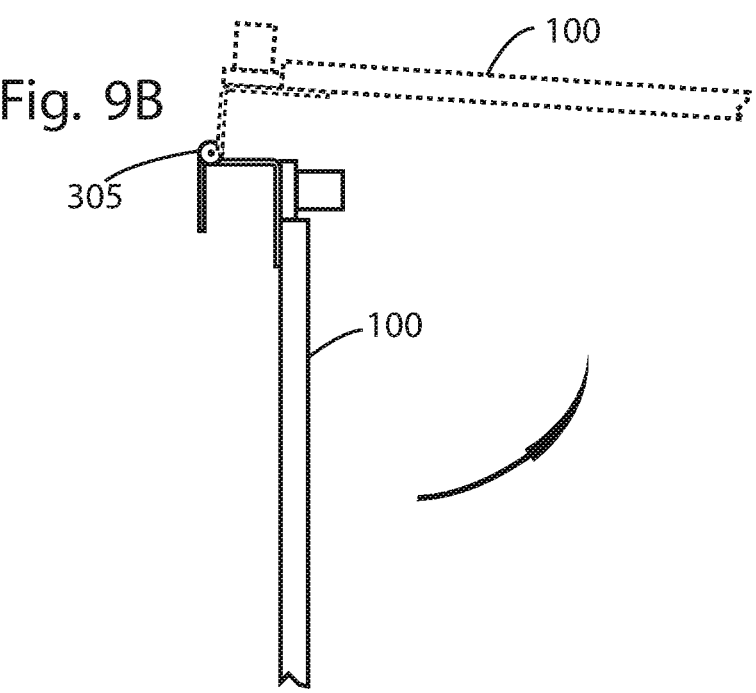
FIG. 9B shows the example swing-away sign of FIG. 9A, according to an embodiment of the present disclosure.

FIG. 9A illustrates a sign 100 mounted or coupled to the rear of a delivery vehicle 300F. In some instances, the sign 100 may be coupled to the rear of the delivery vehicle 300F by the hinges 305, as shown in FIG. 9A, to permit a user to access a door or storage area at the back of the delivery vehicle 300F. FIG. 9B illustrates the sign 100 in a lowered position in solid lines, and in an elevated, or alternate, position in dashed lines. The hinges 305 permit the sign 100 to lift or transition to alternate position, thereby allowing access to the rear of the delivery vehicle 300F.

Figure 10A:
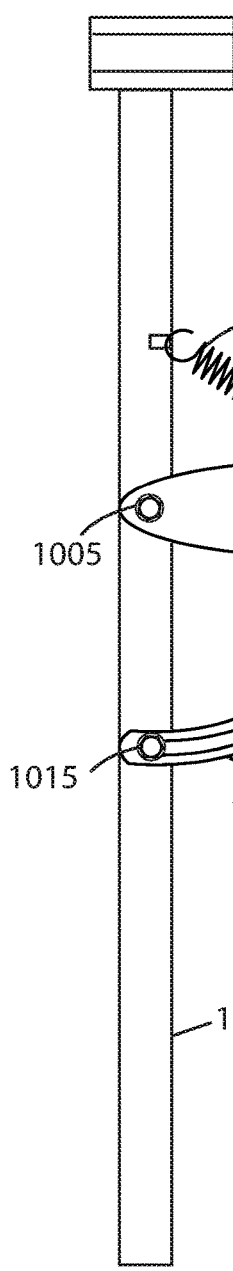
FIG. 10A shows an example sign having a pivot, according to an embodiment of the present disclosure.
Figure 10B:
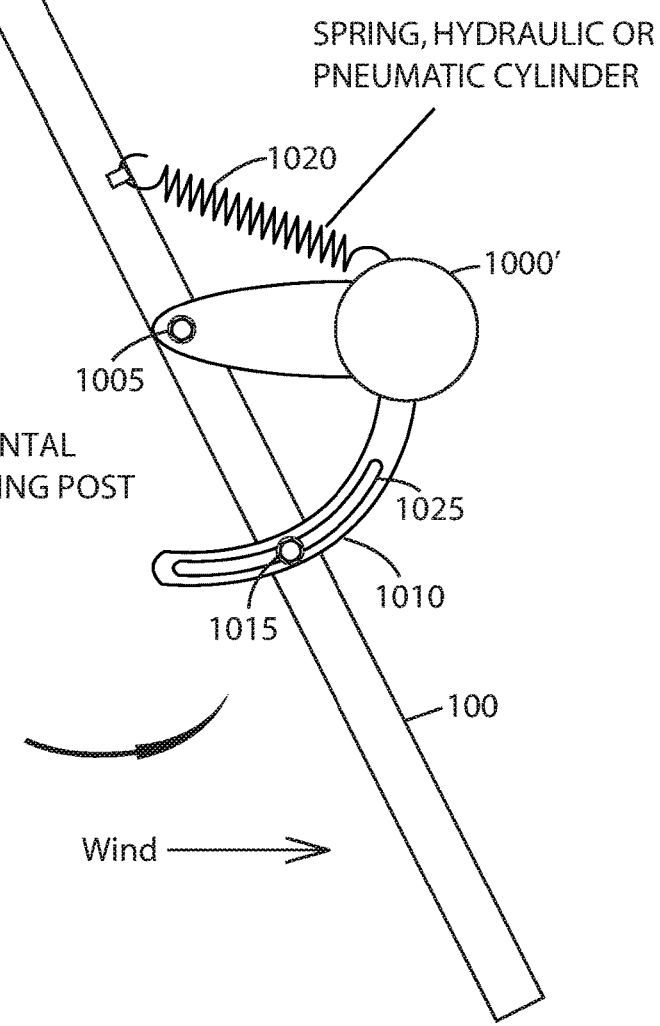
FIG. 10B shows the example sign of FIG. 10A, according to an embodiment of the present disclosure.

FIGS. 10A and 10B illustrate an alternative mounting for a sign 100. In some instances, the alternative mounting may be useful when the sign 100 is subjected or exposed to strong winds. For instance, tilting the sign 100 with respect to the direction of the wind may reduce a force applied to the sign 100 and/or a mount coupled to the sign 100, thereby reducing potential damage to the sign 100 and/or damage a vehicle (e.g., roof) or a fixed stanchion to which the sign 100 is secured. As shown, the sign 100 may be secured to a post 1000 via a pivot 1005 and about which the sign 100 may rotate. A spring 1020 may urge the sign 100 to rotate clockwise about the pivot 1005. The pivot 1005 may be disposed away from a center of the sign 100 such that as wind strikes a front of the sign 100, the sign 100 may pivot about the pivot 1005 and rotate in the direction indicated in FIG. 10B.

A curved arm 1010 with a slot 1025 is secured to the post 1000. A pin 1015 may be disposed in the slot 1025 and secure the curved arm 101 to the sign 100. For instance, the pin 1015 may slidably move within the slot 1025 as the sign 100 rotates about the pivot 1005. In some instances, the pin 1015 may rests against a lower end of the slot 1025 via a counterclockwise torque exerted on the sign 100 by the spring 1020.

As wind strikes the front of the sign 100, the wind may exert a torque on the sign 100, as shown in FIG. 10B. If the force of wind overcomes the force exerted by the spring 1020, the sign 100 may rotate about the pivot 1005 and swing in a direction as indicated in FIG. 10B. In some instances, the pin 1015 may limit a rotational or angular distance the sign 100 may travel. When the force of the wind on the sign 100 is below a predetermined amount (e.g., the amount of tension force applied by the spring 1020), the spring 1020 urges the sign 100 back to a vertical position, as shown in FIG. 10A.

FIGS. 11A, 11B, and 11C illustrate a sign 100 disposed above a vehicle and in an erected or deployed state. As shown, the vehicle may be in front of or ahead of traffic 105. The sign 100 may include the displays 130 and/or 130', respectively, for presenting content to the occupants of the vehicles in the traffic 105. In FIG. 11A, the sign 100 may be associated with a display sight line at which the displays 130 and/or 130' are viewable. For instance, the sign 100 may include the privacy filter 240 to limit angles at which the displays 130 and/or 130' are viewable. The sign 100 and/or the vehicle to which the sign is mounted may include mechanisms, hinges, and/or actuators that change the viewing angles at which the displays 130 and/or 130' are viewable.

For instance, as shown in FIG. 11A, the displays 130 and/or 130' may be viewable at an angle of 30 degrees such that certain occupants within the traffic 105 are permitted to view content output on the sign 100. In doing so, the displays 130 and/or 130' may be directed to be viewable from a predetermined distance from the sign 100. However, the sign 100 may pivot, as shown in FIGS. 11B and 11C, to adjust the displays 130 and/or 130' to a different portion of the traffic 105. As such, the viewing distance and/or the range of viewing angles may be modified.

The sign 125 includes one or more sensors 125 that detect speeds of vehicles in the traffic 105 to present the display 130 and/or the display 130'.

Figure 11D:
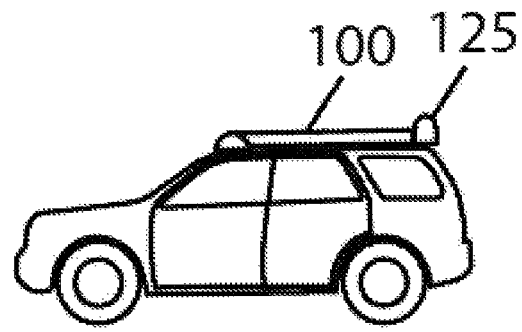
FIG. 11D shows an example sign usable with a vehicle, according to an embodiment of the present disclosure.
Figure 11E:
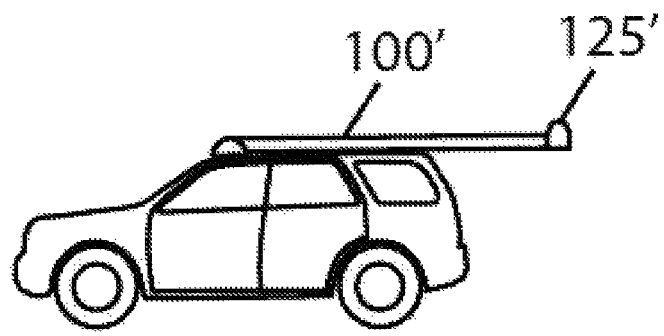
FIG. 11E shows an example sign usable with a vehicle, according to an embodiment of the present disclosure.

FIGS. 11D and 11E illustrate the sign 100 in a folded-down or retracted state. In the retracted state, the sign 100 may prevent display of content to the traffic 105. In some instances, the sign 100 may retract based at least in part on the speed of the vehicle (to which the sign 100 couples) traveling faster than a predetermined speed. Additionally, FIGS. 11D and 11E illustrate that the sign 100 may vary in height or size, which may affect the viewing angles of the sign 100 and/or the amount of the traffic 105 that is able to view the displays 130 and/or 130'. For instance, as shown, the sign 100 in FIG. 11E may be larger and/or may extend farther than the sign 100 in FIG. 11D, thereby permitting more of the traffic 105 or occupants to observe the displays 130 and/or 130' when the sign 100 deploys.

Description & Operation—Additional Capabilities of Sign

The signs discussed herein may have real advertising value, including the duration of messages, the use of messages targeted to specific locations and specific demographics. Advertisers whose messages are displayed on the sign may make payment to the managers, licensees, and/or owners of the signs according to these demographics, the duration of display of a message, and so forth. This sign may also provide an opportunity for small business owners and others to present an advertising message to a highly targeted local market at a cost considerably below TV and/or other mass media. For example, a small family or carry out restaurant may utilize the sign to inform motorists that one kilometer ahead they may pick up dinner or make reservations. In some instances, a merchant may make offers for products and/or services that may be purchased by vehicle occupants and others using cell phones, for instance. Such in-vehicle commerce may increase substantially as self-driving vehicles are developed and become more commonplace. Additionally, the effectiveness of such advertising may be measured very quickly.

The nature of the advertising may be used as a demographic on a larger scale. For example, a company with national sales may learn ways to optimize their advertising at new locales by noting the duration and kinds of advertisements placed by local vendors at other similar locales.

Buses and freight-carrying vehicles often include built-in GPS devices that relay their location, which may be utilized by the sign for location-based targeted advertising. Other information about the vehicle, such as hours of continuous operation, number, duration, location of stops, and/or the like may be deduced from this information as well. In the future, it is anticipated that vehicles will contain "black box" transponders of a similar nature, including RFID tags, that relay information about the vehicle and its operator to one or more central locations. This information may be gathered to further customize the operation of signs and/or to gather demographics.

CONCLUSION, RAMIFICATIONS, AND SCOPE

This application, described in part, an improved advertising display system for use in the vicinity of vehicular traffic. Signs used in the system may convey video information, still information, and may be blank. A sensor comprising radar, sonar, lidar, infrared, vibration, pressure, video or other system may sense movement of vehicles in the vicinity of the sign and transmit this information to an electronic system that controls an operation of the sign. In some instances, when nearby traffic is moving above a predetermined speed, the sign may display a still or blank image. In some instances, the sign may cease output of an image when traffic is moving above the predetermined speed. Alternatively, when nearby traffic is stopped or moving below a predetermined speed, the sign may display a changing information such as videos or a series of changing images. By operating in this way, the sign may maximize the impact of advertisements while potentially minimizing distraction of nearby drivers. In some instances, the system may gather billing information depending on the location and duration an advertisement is displayed on the sign. Additionally, or alternatively, the system may gather demographic information about drivers and/or occupants of vehicle. This demographic information may be transmitted via an associated data resource. In additional instances, the system may use GPS data to determine a location of the sign and utilize the location to determine and/or select content for display that may have the greatest advertising impact.

In some instances, the system may provide a business method whereby a governmental unit granting display erection rights, and optionally electrical service and traffic control system access, on its property for advertising purposes, shall receive a percentage of the revenue generated by advertising conducted through said display. For example, after a 35% overhead burden is subtracted, remaining revenue may be shared on an equal, or alternate, basis between the government and the advertising media operator. Such public-private partnership is unique, as compared to, for example, franchise fees which cable TV companies pay the local franchising authority for the right to access public rights and offer cable service. Effectively serving as a public-private partnership, the partnership may provide a major revenue stream for municipalities and counties with little or no additional cost to taxpayers. Inasmuch as a sign on government property requires an easement, license, and/or permits of various types and descriptions, it may be advantageous to partner with the government to motivate participation. The system discussed herein may employ a free market concept in that each party contributes something to the whole and neither is parasitic. The system and/or sign may use existing infrastructure and power sources for display support, which would otherwise cost many millions of dollars and take years to erect. However, in some instances, the signs may include solar panels that power their operation.

In some instances, the system may find value in densely populated cities suffering from revenue declines, high crime and lack of adequate police and other services that may benefit greatly from increased revenues generated by the advertisements.

Prior art teaches in a direction opposite the instance disclosure. Conventional displays are instead limited to non-cyclic or changing images and are intended to attract the attention of occupants in moving vehicles. In so doing, conventional signs may inevitably contribute to an increase in roadway accidents, injuries, and/or deaths. The instant disclosure, however, produces a clear and unexpected result in presenting an invention that may avoid driver distraction. Prior art fails this test as it is highly unlikely that any governmental agency would permit such a system, considering that driver distraction is now a significant cause of highway accidents and/or deaths.

It is difficult to conceive of a more urgent, long felt and unsolved need than reducing human deaths and crippling injuries directly attributable to unsafe roadway and bridge conditions. As previously noted, "[b]ad highway design and conditions are a factor in more than half the fatal crashes in the United States, contributing to more deaths than speeding, drunken driving or failure to use seat belts . . . " according to a 2009 study for the Transportation Construction Coalition. "Road-related conditions were a factor in 22,000 fatalities and cost $217.5 billion each year . . . " Over a fifteen-year period perhaps well over 300,000 people have died because of poor road conditions and the lack of roadway funding is clearly the direct cause of these deaths.

Many of today's roadways are a clear and present hazard. Certainly, there is no higher priority than preserving human life. Rarely, if ever, has there been such a clear and direct solution to such a widespread and tragic problem as presented in the instant innovation.

The lack of success of prior art illustrates the failure of others to provide a practical solution and instead would likely contribute to an increase in roadway deaths with distracting signage. The present innovation, through related funding by advertisers, may provide the financial resources to construct and improve public roadways, directly reducing accidents and the resulting deaths, crippling injuries and heartache of survivors and their loved ones. The advertising industry is one of the greatest revenue generator in today's economy. Google, Inc., for example had total revenue of almost $75 Billion in 2015, about 97% of which was derived from advertising activity. The instant invention has the potential to generate unprecedented advertising income that may be applied to roadway and bridge infrastructure providing very strong financial incentives to governmental units in permitting placement and operation of such signage.

Applicant asserts the innovation to be novel and unobvious, exempt from prior art combinations and therefore patentable. It presents a long felt but unresolved need, teaching away from the direction of the prior art and succeeding where others have conventionally failed, dating back many years in this rapidly advancing technological age. It provides a clear and acceptable means for funding roadway construction and improvements.

It is difficult to imagine a more direct cause and effect relationship between poor roadway conditions with the loss of tens of thousands of lives and a provision of funding that would inevitably flow to governments for the widespread construction, repair, and maintenance of our roadways.

As previously noted, "[i]n the 1960s and early 1970s, gas taxes and other fees on drivers covered more than 70 percent of the costs of highway construction and maintenance . . . (today) . . . nearly as much of the cost of building and maintaining highways now comes from general taxes . . . as comes from gasoline taxes or other 'user fees' on drivers. Roads pay for themselves less and less over time. The share of transportation costs covered by gasoline taxes is likely to continue to decline as a result of inflation, more fuel-efficient cars, and slower growth in driving." In effect, this declining provision for road funding is becoming an increasingly greater problem and public resistance to increased taxes reflects little receptivity.

"The American Society of Civil Engineers has concluded that over the next decade, it will cost more than $3.3 trillion to keep up with repairs and replacements to U.S. roads, bridges, airports, power grid and other critical infrastructure, but based on current funding levels, the nation will come up more than $1.4 trillion short. When projected to 2040, the shortfall is expected to top $5 trillion, unless new funds are allocated."

'A recent report from the state Senate said 68 percent of California roads are in poor or mediocre condition, the 44th worst record in the nation. It also said the cost for all of the unfunded repairs identified by state and local officials in the coming decade is about $135 billion . . . . If more money isn't found, "these roads will disintegrate to the point where they'll have to be rebuilt, which is very, very expensive," . . . . The state transportation department, Caltrans, estimates every dollar spent on preventive maintenance today averts as much as $10 in repairs later . . . . If motorists do pay more in taxes and fees, they may be disappointed to hear that the money will do little to improve their biggest complaint about roads—traffic. The money under discussion is primarily to keep roads, bridges and related infrastructure like culverts from falling apart, not relieve traffic.'

Applicant's innovation presents a clear and acceptable solution to this growing problem, providing roadway funding without direct cost to taxpayers. All equipment and operational costs may be borne by the private partner and operational entity. Funding paid by advertisers may provide unprecedented income for public infrastructure construction and maintenance.

Importantly, Applicant's system provides a highly equitable funding system for roadway infrastructure construction and maintenance in that the users effectively, through exposure to advertising, provide a substantial source of funding. Effectively similar to fuel tax, the more miles driven shall generally result in more exposure to advertising.

Such a medium may also provide valuable services to vehicle occupants with information on local food, lodging, merchandise and recreational facilities, heretofore not readily available. Smaller businesses may be helped by accessing lower cost highly localized advertising.

While the above description contains many specificities, these should not be construed as limitations on the scope, but as exemplifications of some present embodiments. Many other ramifications and variations are possible within the teachings. Additional features may be added, such as a sound system that provides audible information to nearby drivers and pedestrians. The sign may be used to provide roadway information such as notification of accidents or traffic ahead, child protection information, and the like. The sign may be used singly or with other signs and it may range from large to small. It may be used to display three-dimensional anaglyphs. The information may be displayed in monochrome or full color.

Thus, the scope should be determined by the appended claims and their legal equivalents, rather than the examples and particulars given.

What is claimed is:

1. A vehicle-mounted system comprising:
   a motion sensor;
   a sign including a display viewable from a range of angles;
   a privacy filter coupled to the sign, wherein the privacy filter limits the range of angles over which the display is viewable to a predetermined range of vertical viewing angles relative to the display; and
   memory communicatively connected to the sign, the memory storing instructions that, when executed by one or more processors, cause the one or more processors to perform operations comprising:
   determining, based at least in part on receiving data from the motion sensor, speeds of one or more vehicles within the predetermined range of vertical viewing angles relative to the display;
   outputting for display on the sign and based at least in part on the speeds of the one or more vehicles being less than a threshold speed, first image data; and
   outputting for display on the sign and based at least in part on the speeds of the one or more vehicles being greater than the threshold speed, second image data, the second image data being different than the first image data.

2. The vehicle-mounted system of claim 1, wherein:
   the first image data corresponds to at least one of:
     a dynamic image;
     a changing image; or
     video data; and
   the second image data corresponds to at least one of:
     a static image;
     a blank image; or
     at least two sequential images.

3. The vehicle-mounted system of claim 1, wherein outputting the first image data or outputting the second image data is further based at least in part on detecting a threshold number of vehicles within the predetermined range of vertical viewing angles relative to the display.

4. The vehicle-mounted system of claim 1, further comprising a lift coupling the sign to a vehicle or trailer, and wherein the lift is configured to adjust a height of the sign relative to the vehicle or trailer.

5. The vehicle-mounted system of claim 1, further comprising an adjustment mechanism coupling the sign to a vehicle or trailer, and wherein the adjustment mechanism is configured to adjust an orientation of the display screen relative to the vehicle or the trailer.

6. The vehicle-mounted system of claim 1, the operations further comprising receiving an indication from a traffic control signal representing an output of a stop indication by the traffic control signal, and wherein outputting the at least one of the first image data or the second image data is further based at least in part on receiving the stop indication.

7. A system configured to mount to a vehicle or a trailer, the system comprising:
   one or more processors;
   a sign including:
     a display; and
     a privacy filter coupled to the sign, wherein the privacy filter limits viewing of the display such that at least a portion of the display is viewable within a first range of distances and less than the at least the portion of the display is viewable within a second range of distances;
   a motion sensor configured to detect speeds of one or more vehicles within the first range of distances from the sign; and
   one or more non-transitory computer-readable media storing computer-executable instructions that, when executed by the one or more processors, cause the one or more processors to perform operations comprising:
     transmitting to the sign and based at least in part on speeds of the one or more vehicles being less than a threshold speed, a first image; and
     transmitting to the sign and based at least in part on the speeds of the one or more vehicles being greater than the threshold speed, a second image, the second image being different than the first image.

8. The system of claim 7, further comprising at least one of:
   a lift operably coupled to the display, wherein the lift is configured to adjust a height of the display relative to the vehicle or the trailer; or
   an adjustment mechanism coupling the display to the vehicle or the trailer, and wherein the adjustment mechanism is configured to adjust an orientation of the display relative to the vehicle or the trailer.

9. The system of claim 7, wherein the threshold speed comprises a first threshold speed, and wherein the one or more processors are executable to perform operations further comprising:
   determining a speed of the vehicle;
   positioning the sign at a first height relative to the vehicle or the trailer based at least in part on the speed of the vehicle or the trailer being less than a second threshold speed; and
   positioning the sign at a second height relative to the vehicle or the trailer based at least in part on the speed of the vehicle or the trailer being greater than the second threshold speed, the second height being less than the first height.

10. The system of claim 7, further comprising a light sensor, wherein the one or more processors are executable to perform operations further comprising:

determining, via the light sensor, a brightness of an environment in which the display resides; and at least one of:

increasing a brightness of the display based at least in part on the brightness; or decreasing a brightness of the display based at least in part on the brightness.

11. The system of claim 7, further comprising a global positioning system (GPS), the GPS indicating a location of the sign, and wherein at least one of:

the first image is based at least in part on the location of the sign; or the second image is based at least in part on the location of the sign.

12. The system of claim 7, further comprising a camera, wherein the operations further comprise:

receiving, from the camera, image data representing one or more occupants of the one or more vehicles; and determining information about the one or more occupants, wherein at least one of the first image or the second image is based at least in part on the information about of the one or more occupants.

13. The system of claim 7, further comprising a camera, wherein the operations further comprise receiving, from the camera, image data representing an identifier of another vehicle, and wherein at least one of the first image or the second image is based at least in part on the identifier of the other vehicle.

14. The system of claim 7, wherein the operations further comprise receiving data from a traffic control signal indicating an output of the traffic control signal, and wherein at least one of:

transmitting the first image to the sign is further based at least in part on the output of the traffic control signal; or transmitting the second image to the sign is further based at least in part on the output of the traffic control signal.

15. The system of claim 7, wherein at least one of transmitting the first image or transmitting the second image is further based at least in part on detecting a threshold number of vehicles within the first range of distances from the sign.

\* \* \* \* \*